US009800056B2

(12) United States Patent
Yu et al.

(10) Patent No.: US 9,800,056 B2
(45) Date of Patent: Oct. 24, 2017

(54) MULTI-POWER SUPPLY SYSTEM AND CONTROL METHOD THEREOF

(71) Applicant: Delta Electronics (Shanghai) Co., Ltd., Shanghai (CN)

(72) Inventors: Xiu-Feng Yu, Shanghai (CN); Zhi-Jiang Deng, Shanghai (CN); Guo-Dong Yin, Shanghai (CN); Ben Wu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 435 days.

(21) Appl. No.: 14/583,805

(22) Filed: Dec. 29, 2014

(65) Prior Publication Data

US 2015/0214742 A1    Jul. 30, 2015

(30) Foreign Application Priority Data

Jan. 28, 2014  (CN) .......................... 2014 1 0042044

(51) Int. Cl.
*H02J 4/00* (2006.01)
*H02H 3/18* (2006.01)
(Continued)

(52) U.S. Cl.
CPC ................. *H02J 4/00* (2013.01); *H02H 3/18* (2013.01); *H02H 7/1203* (2013.01); *H02J 1/102* (2013.01);
(Continued)

(58) Field of Classification Search
CPC .... H02J 4/00; H02J 1/102; H02J 1/108; H02J 2001/106; H02H 3/18; H02H 7/1203; Y10T 307/729
(Continued)

(56) References Cited

U.S. PATENT DOCUMENTS

2004/0174144 A1*  9/2004  Huang ................ H02M 3/1588
                                                              323/224
2005/0006956 A1*  1/2005  Shi .......................... H02J 1/102
                                                               307/43
(Continued)

FOREIGN PATENT DOCUMENTS

CN          101286083 A      10/2008
CN          201877884 U       6/2011
(Continued)

*Primary Examiner* — Brandon S Cole
(74) *Attorney, Agent, or Firm* — CKC & Partners Co., Ltd.

(57) ABSTRACT

A multi-power supply system and a control method thereof are disclosed. The multi-power supply system includes a first power-supply unit, a second power-supply unit, a switching unit, and a control unit. The power-supply unit comprises a reverse current prevention circuit, a converter circuit, and an input circuit. The switching unit is electrically coupled to the first power-supply unit and the second power-supply unit. When the first and second input circuits are in normal operation, the control unit controls the switching unit to be turned off to allow the first power-supply unit and the second power-supply unit to supply power to a load. When one of the first and second input circuits is in abnormal operation, the control unit controls the switching unit to be turned on. The switching unit cooperates with the first and second reverse current prevention circuits to achieve the switching of input.

27 Claims, 14 Drawing Sheets

(51) Int. Cl.
*H02J 1/00* (2006.01)
*H02J 1/10* (2006.01)
*H02H 7/12* (2006.01)

(52) U.S. Cl.
CPC ......... *H02J 1/108* (2013.01); *H02J 2001/106* (2013.01); *Y10T 307/729* (2015.04)

(58) Field of Classification Search
USPC ...................................................... 307/43–87
See application file for complete search history.

(56) References Cited

U.S. PATENT DOCUMENTS

| | | | | |
|---|---|---|---|---|
| 2005/0286277 | A1* | 12/2005 | Krein | H02J 1/102 |
| | | | | 363/65 |
| 2011/0133559 | A1* | 6/2011 | Yamashita | G06F 1/30 |
| | | | | 307/66 |
| 2011/0254526 | A1* | 10/2011 | Luo | H02M 3/1584 |
| | | | | 323/284 |
| 2012/0081937 | A1* | 4/2012 | Phadke | H02J 1/10 |
| | | | | 363/95 |
| 2013/0207474 | A1* | 8/2013 | Delay | H02J 3/383 |
| | | | | 307/72 |
| 2014/0021793 | A1* | 1/2014 | Chu | H02J 1/00 |
| | | | | 307/82 |

FOREIGN PATENT DOCUMENTS

| | | |
|---|---|---|
| CN | 201898365 U | 7/2011 |
| CN | 202135054 U | 2/2012 |
| CN | 102832645 A | 12/2012 |
| CN | 103023334 A | 4/2013 |
| CN | 102097854 B | 8/2013 |
| CN | 103236788 A | 8/2013 |
| CN | 103296879 A | 9/2013 |
| CN | 103312168 A | 9/2013 |
| CN | 102163871 B | 1/2014 |
| TW | 201401717 A | 1/2014 |
| WO | 2013/122581 A1 | 8/2013 |

\* cited by examiner

MULTI-POWER SUPPLY SYSTEM AND CONTROL METHOD THEREOF

RELATED APPLICATIONS

This application claims priority to Chinese Application Serial Number 201410042044.0, filed Jan. 28, 2014, which is herein incorporated by reference.

BACKGROUND

Field of Invention

The present invention relates to a power supply system. More particularly, the present invention relates to a multi-power supply system and a control method thereof.

Description of Related Art

Nowadays, more and more power supply products move toward high efficiency, high power density, high reliability, and low cost. In order to ensure reliability of input power supply, some DC power supplies adopt a redundancy design that uses a dual-input power supply. In this case, how to realize the coupling and controls between power supplies in the dual-input power supply and between the dual-input power supply and a next stage power supply has become a key design aspect.

For the forgoing reasons, there is a need for solving the above-mentioned problems by providing a multi-power supply system and a control method thereof.

SUMMARY

In order to satisfy the reliability and flexibility requirements of the multi-power supply system and effectively increase the utilization rates of internal devices and control the cost, the present disclosure provides a multi-power supply system and a control method thereof. Not only is the switching of the power supply realized, but the internal devices can also be fully utilized.

A multi-power supply system is provided. The multi-power supply system comprises a plurality of power-supply units, a switching unit, and a control unit. Each power-supply unit comprises a reverse current prevention circuit, a converter circuit, and a input circuit, where the input circuit is electrically coupled to the converter circuit via the reverse current prevention circuit. The switching unit is electrically coupled to the plurality of power-supply units. The control unit is electrically coupled to the switching unit. When all the input circuits of the plurality of power-supply units are in normal operation, the control unit controls the switching unit not to operate, the plurality of power-supply units collectively supply power to a load. When at least one of the input circuits of the plurality of power-supply units is in abnormal operation, the control unit controls the switching unit to operate, the switching unit cooperates with the reverse current prevention circuit of the plurality of power-supply units and the plurality of power-supply units to receive power of at least one of the input circuits of the plurality of power-supply units to collectively supply power to a load.

The disclosure provides a control method of a multi-power supply system as defined above. The control method comprises: (A). determining whether the input circuits of the plurality of power-supply units operate in normal operation; (B). when all the input circuits of the plurality of power-supply units are in normal operation, controlling the switching unit not to operate so as to allow the first power-supply unit and the second power-supply unit to collectively supply power to a load; and (C). when at least one of the input circuit of the plurality of power-supply units is in abnormal operation, controlling the switching unit to operate so as to allow the switching unit to cooperate with the reverse current prevention circuits and the converter circuits of the plurality of power-supply units to receive power of at least one of the input circuits of the plurality of power-supply units to collectively supply power to a load.

In summary, the present disclosure provides a technical solution in which a controllable switching unit is added in the multi-power supply system to realize the switching of power supply. In one aspect, when the multiple inputs of the system are in normal operation, power balance or current balance between the multiple inputs is achieved through properly controlling the system; when at least one of the inputs of the system is in abnormal operation, the redundant input can be realized. That is, at least one input in normal operation supplies power to a plurality of converter circuits. The converters in the plurality of converter circuits can be designed based on half load plus a margin to save cost. In other aspect, the converters in the protection circuit and the first and second converter circuits can be designed based on half load plus a margin if the switching unit is disposed in front of the protection circuit. However, the present disclosure is not limited in this regard.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the disclosure.

DESCRIPTION OF THE EMBODIMENTS

Figure 1:
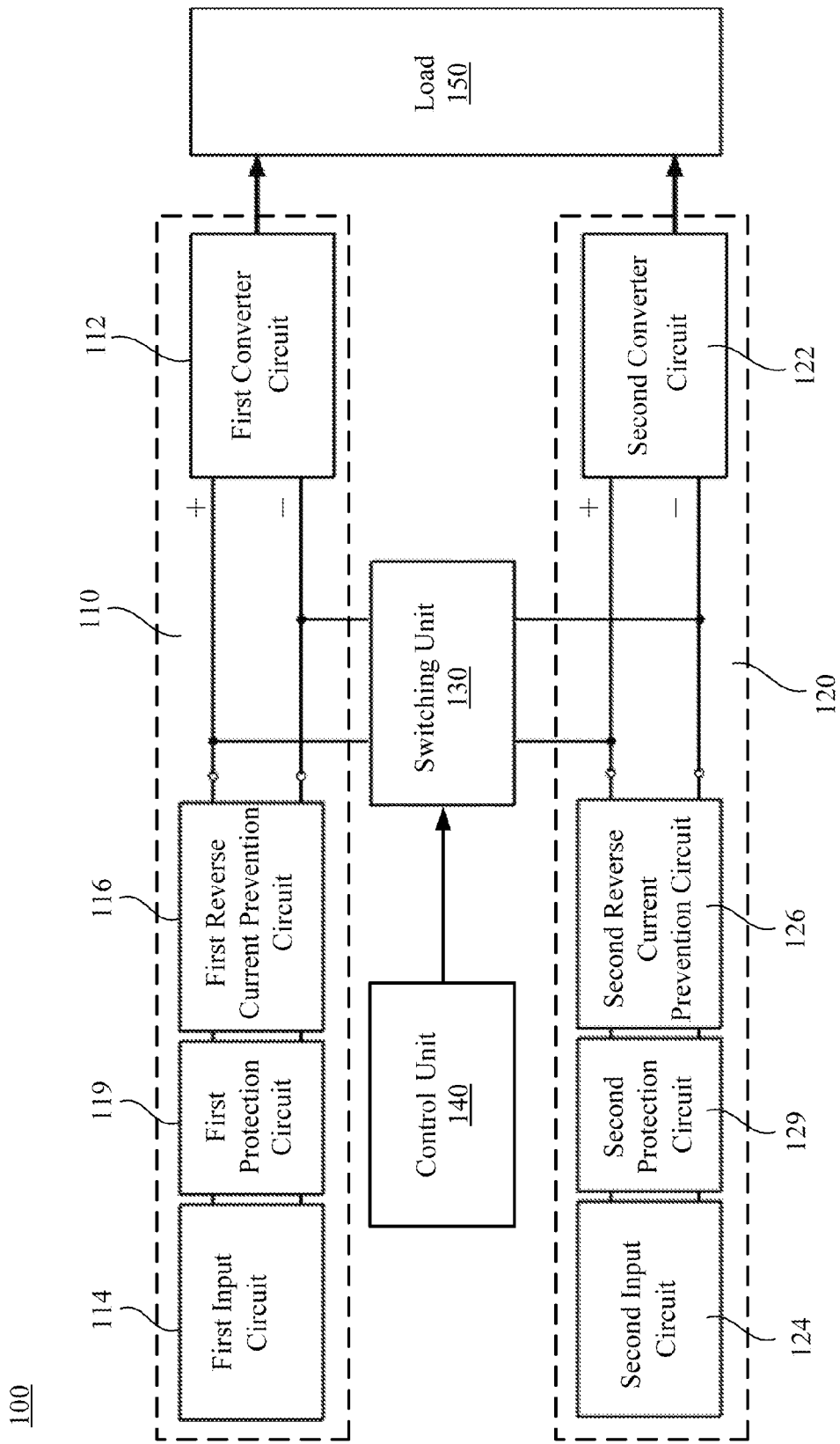
FIG. 1 depicts a schematic diagram of a multi-power supply system according to one embodiment.

Reference will now be made in detail to the present embodiments of the disclosure, examples of which are illustrated in the accompanying drawings. Wherever possible, the same reference numbers are used in the drawings and the description to refer to the same or like parts. In other instances, well-known devices and steps are not described in the embodiments to avoid unnecessary limitations to the present disclosure.

As used in the description herein and throughout the claims that follow, the meaning of "a", "an", and "the" includes reference to the plural unless the context clearly dictates otherwise.

Also, as used in the description herein and throughout the claims that follow, the term "around", "about", or "approximately" modifying any quantity refers to variation in the numerical quantity that would not affect the nature of the quantity. Unless specified otherwise, in the present embodiments, the term "around", "about", or "approximately" means within 20% of the reported numerical value, preferably within 10% of the reported numerical value, and more preferably within 5% of the reported numerical value.

As used in the description herein and throughout the claims that follow, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 depicts a schematic diagram of a multi-power supply system according to one embodiment. A multi-power supply system 100 comprises a first power-supply unit 110, a second power-supply unit 120, a switching unit 130, and a control unit 140. In the structure, the first power-supply unit 110 comprises a first converter circuit 112, a first reverse current prevention circuit 116, and a first input circuit 114. The first input circuit 114 is electrically coupled to the first converter circuit 112 via the first reverse current prevention circuit 116. The second power-supply unit 120 comprises a second converter circuit 122, a second reverse current prevention circuit 126, and a second input circuit 124. The second input circuit 124 is electrically coupled to the second converter circuit 122 via the second reverse current prevention circuit 126. The switching unit 130 is electrically coupled to the first power-supply unit 110, the second power-supply unit 120, and the control unit 140. The mainly function of the reverse current prevention circuits is to prevent current from flowing in the reverse direction. The switching unit 130 comprises at least one switch, and the switching unit 130 is under the control of the control unit 140. The control unit 140 detects states of the first input circuit 114 and the second input circuit 124 and outputs a control signal correspondingly based on the states of the first input circuit 114 and the second input circuit 124. The control signal controls turning-on or turning-off of the switch in the switching unit 130 so as to realize the switching of the first input circuit 114 and the second input circuit 124. Each of the first converter circuit 112 and the second converter circuit 122 comprises at least one converter which may be an independent converter or a combination of a plurality of converters connected in series. In one implementation, the first input circuit 114 may be a first DC source. The first converter circuit 112 may be a DC/DC converter, a DC/AC converter, an AC/AC converter, an AC/DC converter, or a combination thereof. The second input circuit 124 may be a second DC source. The second converter circuit 122 may be a DC/DC converter, a DC/AC converter, an AC/AC converter, an AC/DC converter, or a combination thereof. A load 150 may be a DC load or an AC load correspondingly. However, the present disclosure is not limited in this regard, and those of ordinary skill in the art may determine the types of the first/second input circuit 114, 124 and the first/second converter circuit 112, 122 depending on practical applications.

In utilization, the control unit 140 detects voltage of the first input circuit 114 and voltage of the second input circuit 124 to determine whether the voltages of the first input circuit 114 and second input circuit 124 are within a predetermined range. If the voltage of the first input circuit 114 falls into the predetermined range, the control unit 140 determines that the first input circuit 114 is in normal operation. If the voltage of the first input circuit 114 does not fall into the predetermined range, the control unit 140 determines that the first input circuit 114 is in abnormal operation. Similarly, if the voltage of second input circuit 124 falls into the predetermined range, the control unit 140 determines that the first input circuit 114 is in normal operation. If the voltage of second input circuit 124 does not fall into the predetermined range, the control unit 140 determines that the first input circuit 114 is in abnormal operation. The predetermined range can be set based on the actual application. For example, the predetermined range may be set as 80%~120% of the rated input voltage, but the disclosure is not limited to this regard.

When the control unit 140 detects that both the first input circuit 114 and the second input circuit 124 are in normal operation, the control unit 140 outputs a first level (such as a low level) control signal. The first level control signal controls the switch of the switching unit 130 to be turned off. That is, the switching unit 130 is controlled not to operate so as to allow both the first power-supply unit 110 and the second power-supply unit 120 to operate normally. The first power-supply unit 110 and the second power-supply unit 120 thus power the load 150 simultaneously. In one embodiment, not only is the load 150 collectively powered by the first converter circuit 112 and the second converter circuit 122, but input power balance or input current balance is also realized through controlling the first converter circuit 112 and the second converter circuit 122 to output currents balancing each other by the system. That is, the power balance or current balance between the first input circuit 114 and the second input circuit 124 is achieved.

When the control unit 140 detects that the first input circuit 114 is in normal operation and the second input circuit 124 is in abnormal operation, the control unit 140 outputs a second level (such as a high level) control signal. The second level control signal controls the switch of the switching unit 130 to be turned on. That is, the switching unit 130 is controlled to operate. The switching unit 130 cooperates with the first reverse current prevention circuit 116 and second reverse current prevention circuit, 126 so that the first power-supply unit 110 operates normally and the second converter circuit 122 receives power of the first input circuit 114 to operate normally. In this manner, the second converter circuit 122 and the first converter circuit 112 collectively power the load 150.

When the control unit 140 detects that the second input circuit 124 is in normal operation and the first input circuit 114 is in abnormal operation, the control unit 140 outputs the second level (such as the high level) control signal. The second level control signal controls the switch of the switching unit 130 to be turned on. That is, the switching unit 130 is controlled to operate. The switching unit 130 cooperates with the first reverse current prevention circuits 116 and second reverse current prevention circuit 126 so that the second power-supply unit 120 operates normally and the first converter circuit 112 receives power of the second input circuit 124 to operate normally. In this manner, the first converter circuit 112 and the second converter circuit 122 collectively power the load 150.

In one embodiment, through the above control of the switching unit 130, the multi-power supply system 100 can achieve input power balance or input current balance. In one embodiment, when one of the input circuits malfunctions, the other input circuit can supply power to the converters to ensure that both of the first converter circuit 112 and the second converter circuit 122 can provide power to the load 150 in real time. Under the circumstances, half of the full-load power of the load 150 is required for the converters in the first converter circuit 112 and the second converter circuit 122 when they are designed to significantly reduce the design cost of the converters.

It is noted that the above-mentioned abnormal operations of the input circuits do not comprise the situation where an overvoltage is input. That is, the input voltage exceeds the maximum sustainable voltage of the system, which is called the over high input voltage. In one embodiment, when the voltage of one of the first input circuit 114 and second input circuit 124 is too high, the control unit 140 turns off the switching unit 130 to ensure that the power-supply unit in normal operation to operate normally. As a result, the system security and system reliability are ensured.

In one embodiment, as shown in FIG. 1, the first power-supply unit 110 may further comprises a first protection circuit 119. The second power-supply unit 120 further comprises a second protection circuit 129. In the structure, the first protection circuit 119 is electrically coupled to the first reverse current prevention circuit 116 and the first input circuit 114. The second protection circuit 129 is electrically coupled to the second reverse current prevention circuit 126 and the second input circuit 124. The protection circuit mainly comprises relevant circuits for providing protective measures for the input circuit or the converter circuit. For example, the protection circuit may be an electromagnetic compatible filter, a fuse, an input sensing circuit, a surge current protection circuit, other protection circuit, or a combination thereof. As shown in FIG. 1, the protection circuit is disposed at the front end of the reverse current prevention circuit. However, in practical applications, the protection circuit may be disposed at the back end of the reverse current prevention circuit. Or, part of the protection circuit may be disposed at the front end of the reverse current prevention circuit and the other part of the protection circuit may be disposed at the back end of the reverse current prevention circuit, but the present disclosure is not limited in this regard. Those of ordinary skill in the art may select the arrangement and type of the protection circuit depending on practical applications.

Figure 2:
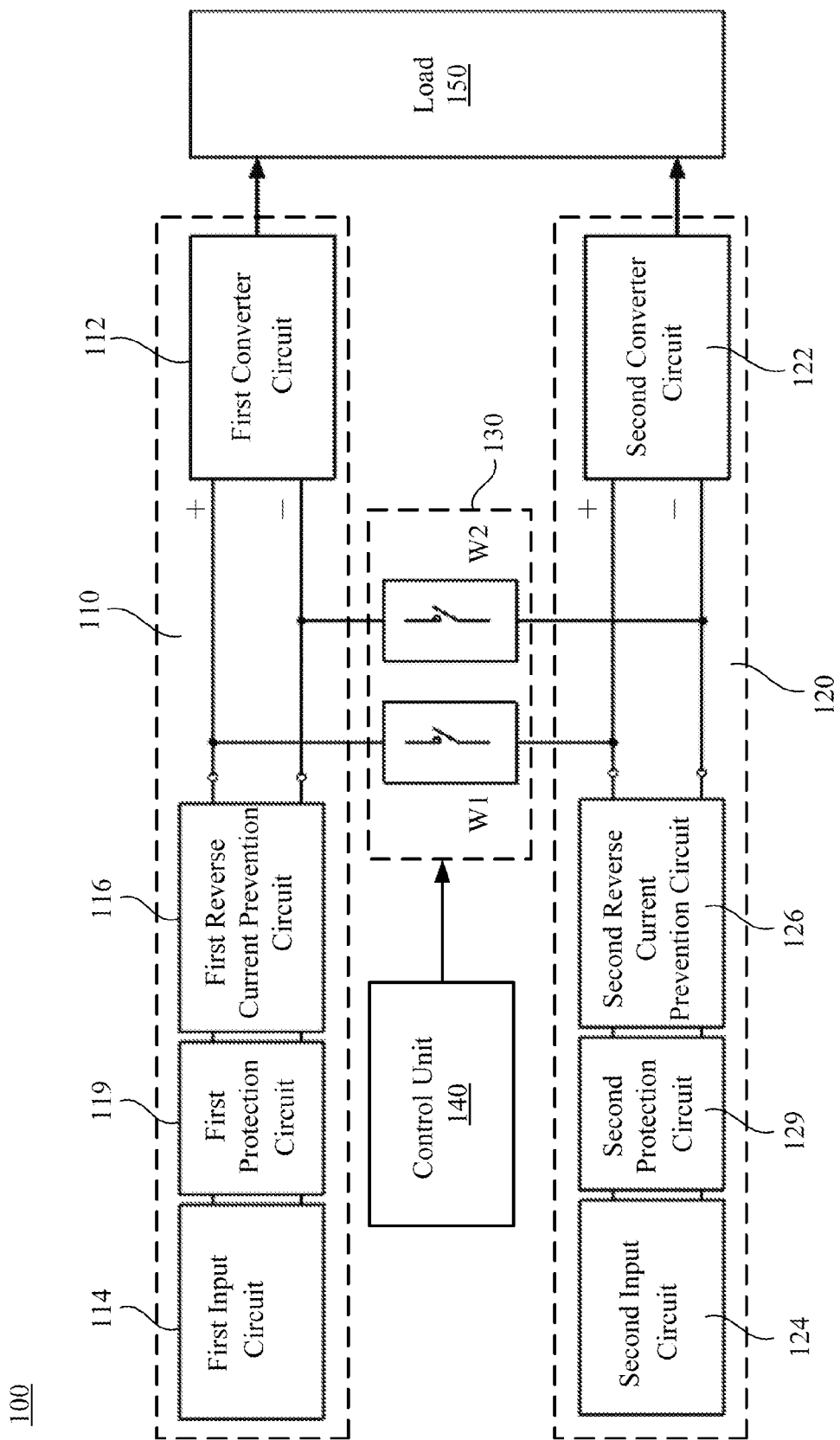
FIG. 2 depicts a schematic diagram of the switching unit of the multi-power supply system in FIG. 1 according to one embodiment.

A further description of a detailed architecture of the above switching unit 130 is provided with reference to FIG. 2. The switching unit 130 comprises a first switch W1 and a second switch W2. In the structure, the first switch W1 has two terminals electrically coupled to a positive input terminal of the first converter circuit 112 and a positive input terminal of the second converter circuit 122, respectively. The second switch W2 has two terminals electrically coupled to a negative input terminal of the first converter circuit 112 and a negative input terminal of the second converter circuit 122, respectively. It is noted that the first switch W1 may be a switching circuit. The switching circuit may comprise one switching device or a plurality of switching devices. For example, the first switch W1 may be a single switching device, such as a metal-oxide-semiconductor field-effect semiconductor device (MOSFET), an insulated gate bipolar semiconductor device (IGBT), other semiconductor device, etc. Or, the first switch W1 may comprise two switching devices that are connected in series opposing, but the present disclosure is not limited in this regard. Those of ordinary skill in the art may select the type of the first switch W1 depending on practical situations. Similarly, the second switch W2 may also be a switching circuit comprising one switching device or a plurality of switching devices, and those of ordinary skill in the art may select the type of the second switch W2 depending on practical situations.

When the control unit 140 detects that both the first input circuit 114 and the second input circuit 124 are in normal operation, the control unit 140 outputs the first level control signal to turn off the first switch W1 and the second switch W2 simultaneously. The first reverse current prevention circuit 116 and the second reverse current prevention circuit 126 thus operate normally so that the first input circuit 114 and the second input circuit 124 supply power individually. In other words, when the first switch W1 and the second switch W2 are turned off, the multi-power supply system 100 is equivalent to the first power-supply unit 110 and the second power-supply unit 120 directly split from the multi-power supply system 100 and supporting the half load. Hence, outputs of the first power-supply unit 110 and the second power-supply unit 120 can support the full-load operation.

When the control unit 140 detects that the first input circuit 114 is in normal operation and the second input circuit 124 is in abnormal operation, the control unit 140 outputs the second level control signal so as to turn on the first switch W1 and the second switch W2 simultaneously. The second reverse current prevention circuit 126 is thus cut off to allow both the first converter circuit 112 and the second converter circuit 122 to receive power supplied by the first input circuit. The first converter circuit 112 and the second converter circuit 122 collectively provide power to the load 150. Conversely, when the second input circuit 124 is in normal operation and the first input circuit 114 is in abnormal operation, the control unit 140 turns on the first switch W1 and the second switch W2 to cut off the first reverse current prevention circuit 116. Thus, both the first converter circuit 112 and the second converter circuit 122 receive the power supplied by the second input circuit 124. The first converter circuit 112 and the second converter circuit 122 collectively provide power to the load 150.

In one embodiment, under the premise that the first switch W1 and the second switch W2 are turned off, the multi-power supply system 100 is equivalent to the first power-supply unit 110 and the second power-supply unit 120 independent of each other. Under the circumstances, the control unit 140 can respectively control the first power-supply unit 110 and the second power-supply unit 120 so as to achieve power balance or current balance as required by design. In another embodiment, even if the second switch W2 has a short-circuit fault, the operation state is equivalent to the state where the second switch W2 is turned on. The multi-power supply system 100 is still allowed to provide power to the load 150, so as to improve the reliability of the multi-power supply system 100.

As mentioned above, no matter which operating mode the multi-power supply system 100 is in, the first converter circuit 112 and the second converter circuit 122 are always collectively provide power to the load 150 in real time. The first converter circuit 112 and the second converter circuit 122 are fully utilized, thus reducing the design cost of the converter circuits. Under the premise that the converter circuit arrives at a reasonable design, interleaving combinations may be adopted and the cost may be reduced largely.

Hence, the utilization rates of devices according to the present disclosure are significantly increased and the cost is greatly reduced to meet the design concept of high power density and low cost. In another embodiment, even if one of the converters or one of the switches in the switching unit malfunctions, the normal operation of the converter circuit is still ensured. As a result, the multi-power supply system has high security and high reliability.

Figure 3A:
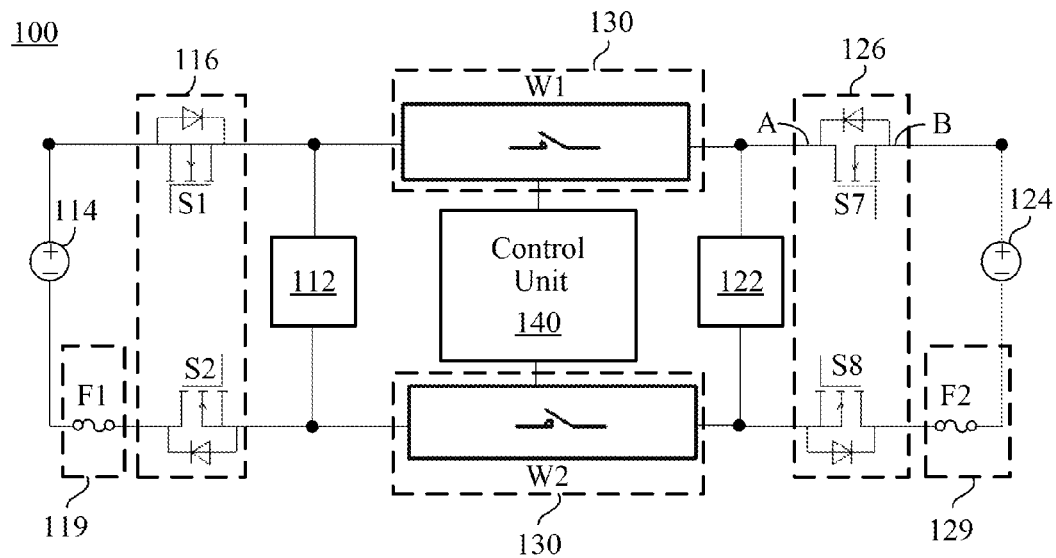
FIG. 3A depicts a circuit diagram of the multi-power supply system in FIG. 2 according to one embodiment.

A further description of a working principle of the above multi-power supply system is provided with reference to FIG. 3A. FIG. 3A depicts a circuit diagram of the multi-power supply system 100 in FIG. 2 according to one embodiment. It is noted that FIG. 3A only serves as a schematic diagram and the load is not shown in the figure. As shown in FIG. 3A, the first reverse current prevention circuit 116 comprises two first semiconductor devices S1, S2. The first protection circuit 119 comprises a fuse F1. Two terminals of one of the first semiconductor devices S1 in the two first semiconductor devices S1, S2 are electrically coupled to the positive input terminal of the first converter circuit 112 and a positive terminal of the first input circuit 114, respectively. Two terminals of the other first semiconductor device S2 in the two first semiconductor devices S1, S2 are electrically coupled to the negative input terminal of the first converter circuit 112 and a negative terminal of the first input circuit 114, respectively. The second reverse current prevention circuit 126 comprises two second semiconductor devices S7, S8. The second protection circuit 129 comprises a fuse F2. Two terminals of one of the second semiconductor devices S7 in the two second semiconductor devices S7, S8 are electrically coupled to the positive input terminal of the second converter circuit 122 and a positive terminal of the second input circuit 124, respectively. Two terminals of the other second semiconductor device S8 in the two second semiconductor devices S7, S8 are electrically coupled to the negative input terminal of the second converter circuit 122 and a negative terminal of the second input circuit 124, respectively.

In utilization, the control unit 140 detects the voltage of the first input circuit 114 and the voltage of the second input circuit 124 to respectively determine whether the voltages of the first input circuit 114 and second input circuit 124 fall into a predetermined voltage range as specified. If the voltage falls into the predetermined voltage range, it is regarded as normal. If the voltage does not fall into the predetermined voltage range, it is regarded as abnormal. When the control unit 140 detects that both the first input circuit 114 and the second input circuit 124 are in normal operation, the control unit 140 outputs the first level (such as the low level) control signal. The first level control signal controls the first switch W1 and the second switch W2 to be turned off simultaneously. The multi-power supply system 100 is equivalent to two single-power supply systems split from the multi-power supply system 100 and supporting the half load. The first input circuit 114 and the second input circuit 124 respectively power the first converter circuit 112 and the second converter circuit 122. In more detailed description, as shown in FIG. 3A, the two first semiconductor devices 31, S2 in the first reverse current prevention circuit 116 operate in a turn-on state, and the first input circuit 114 is electrically coupled to the first converter circuit 112 via the two first semiconductor devices S1, S2 so as to provide power to the first converter circuit 112. The two second semiconductor devices S7, S8 in the second reverse current prevention circuit 126 operate in the turn-on state, and the second input circuit 124 is electrically coupled to the second converter circuit 122 via the two second semiconductor devices S7, S8 so as to provide power to the second converter circuit 122. The first converter circuit 112 and the second converter circuit 122 collectively provide power to the load to achieve the expected power output. Under the circumstances, the multi-power supply system 100 is equivalent to two single-power supply systems that supply power independently of each other. In some embodiment, input power balance and input current balance can be realized through independently controlling the two power-supply units.

When the control unit 140 detects that the first input circuit 114 is in normal operation and the second input circuit 124 is in abnormal operation, the control unit 140 outputs the second level (such as the high level) control signal. The second level control signal controls the first switch W1 and the second switch W2 to be turned on simultaneously and the two first semiconductor devices S1, S2 to be turned on. At this time, the first input circuit 114 supplies power to the first converter circuit 112 via the two first semiconductor devices S1, S2 in the first reverse current prevention circuit 116. The first input circuit 114 also supplies power to the second converter circuit 122 simultaneously via the two first semiconductor devices S1, S2, the first switch W1, and the second switch W2. Since the second input circuit 124 is in abnormal operation, for example, the voltage of the second input circuit 124 is lower than the voltage of the first input circuit 114. When both the first semiconductor device S1 and the first switch W1 are turned on, an electric potential at point A is higher than an electric potential at point B. One of the two second semiconductor devices S7 is thus cut off. The second input circuit 124 does not have a current loop corresponding to the second converter circuit 122 and no longer supplies power to the second converter circuit 122.

Conversely, when the control unit 140 detects that the first input circuit 114 is in abnormal operation and the second input circuit 124 is in normal operation, the control unit 140 outputs the second level (such as the high level) control signal. The second level control signal turns on the switching unit 130 so that at least one of the two first semiconductor devices S1, S2 (for example: the first semiconductor device S2) is cut off and the two second semiconductor devices S7, S8 are turned on. Hence, the second input circuit 124 supplies power to the first converter circuit 112 and the second converter circuit 122 simultaneously.

In one embodiment, when both the first switch W1 and the second switch W2 are turned on and only the first input circuit 114 supplies power to the first and second power-supply unit, the dual inputs are short circuited if the second reverse current prevention circuit 126 fails, for example: the second semiconductor device S7 is short circuited. Under the circumstances, the first switch W1 and the second switch W2 can be turned off to allow the dual-input power supply to become two single-input power supplies independent of each other. The two input circuits respectively supply power to the first converter circuit 112 and the second converter circuit 122 correspondingly. As a result, the multi-power supply system 100 can also operate to provide the load 150 with the full-load output. In one embodiment, when the first switch W1 and the second switch W2 are turned off, the two input circuits respectively supply power to the first converter circuit 112 and the second converter circuit 122 correspondingly. At this time, if one of the first converter circuit 112 and the second converter circuit 122 is damaged, the other converter circuit can still operate to provide the load 150 with half of the full-load output. Similarly, if one of the first and second switches W1, W2 is damaged, the system can still provide the predetermined power to the load. Hence, in some embodiment, adopting the present disclosure multi-power supply system can not only switch the two input circuits in real time to satisfy practical needs but is also secure and reliable.

Figure 3B:
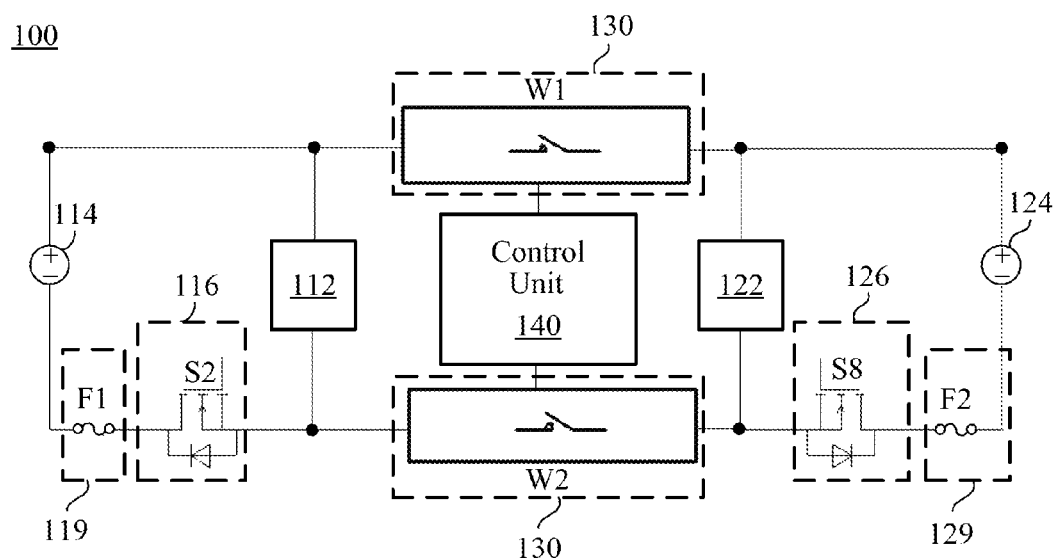
FIG. 3B depicts a circuit diagram of the multi-power supply system in FIG. 2 according to another embodiment.

In one embodiment, the first reverse current prevention circuit 116 may omit either one (for example: the first semiconductor device S1) of the two first semiconductor devices S1, S2. The second reverse current prevention circuit 126 may also omit either one (for example: the second semiconductor device S7) of the two second semiconductor devices S7, S8. However, the present disclosure is not limited in this regard, and those of ordinary skill in the art may select the structures of the reverse current prevention circuits depending on practical situations. FIG. 3B depicts a circuit diagram of the multi-power supply system in FIG. 2 according to another embodiment. As compared with FIG. 3A, the multi-power supply system 100 in FIG. 3B is substantially similar to the multi-power supply system 100 in FIG. 3A except for the semiconductor devices S1, S7 in FIG. 3A being omitted. In FIG. 3B, when both the first input circuit 114 and the second input circuit 124 are in normal operation, the control unit 140 turns off the switching unit 130. The first semiconductor device S2 and the second semiconductor device S8 are turned on. The first input circuit 114 and the second input circuit 124 respectively power the first converter circuit 112 and the second converter circuit 122. When the first input circuit 114 is in normal operation and the second input circuit 124 is in abnormal operation, the control unit 140 turns on the switching unit 130. The first semiconductor device S2 is turned on and the second semiconductor device S8 is cut off. The first input circuit 114 supplies power to the first converter circuit 112 and the second converter circuit 122 simultaneously. When the first input circuit 114 is in abnormal operation and the second input circuit 124 is in normal operation, the control unit 140 turns on the switching unit 130. The first semiconductor device S2 is cut off and the second semiconductor device S8 is turned on. The second input circuit 124 supplies power to the first converter circuit 112 and the second converter circuit 122 simultaneously.

Figure 4:
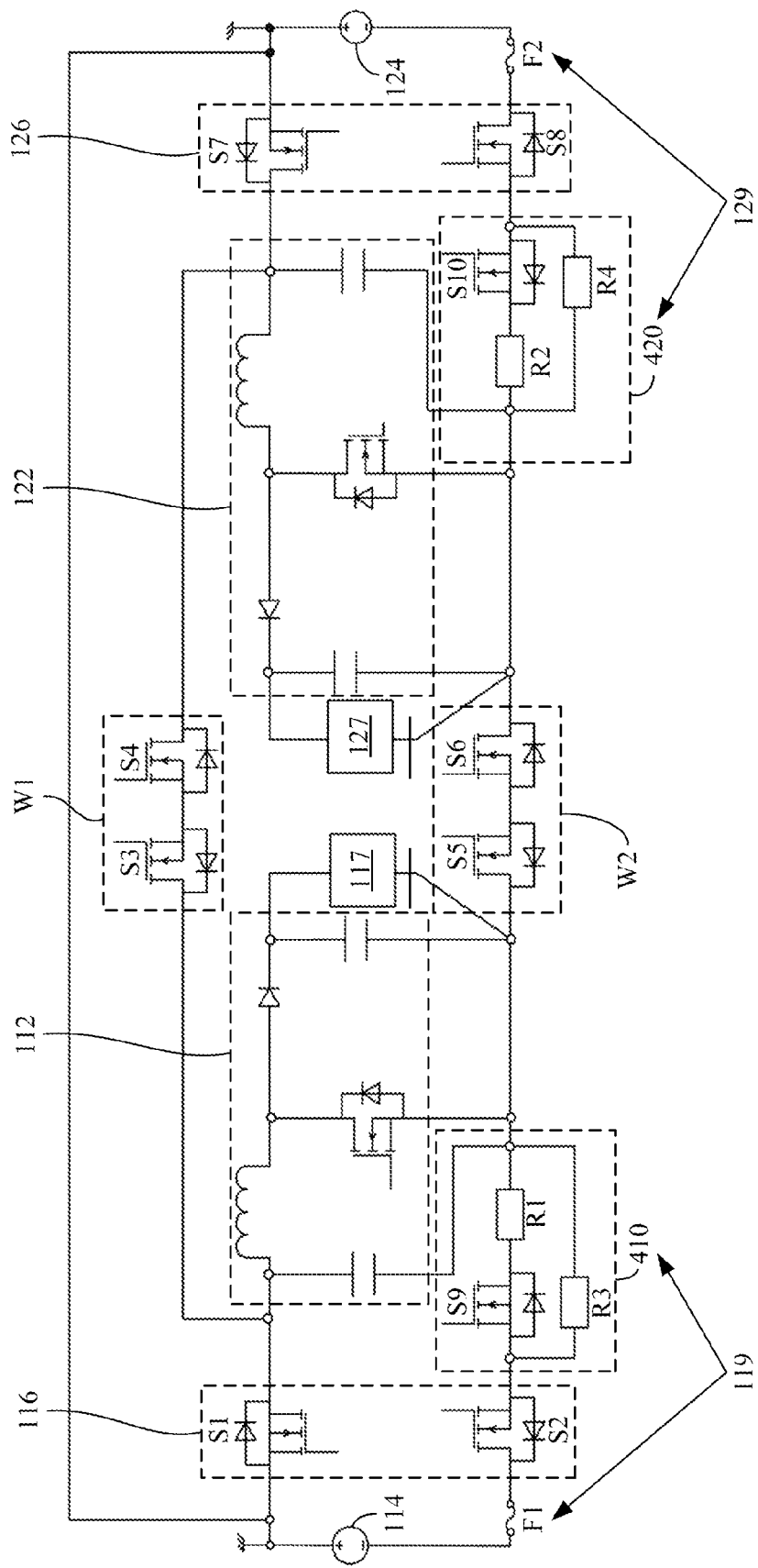
FIG. 4 depicts a circuit diagram of the multi-power supply system in FIG. 2 according to still another embodiment.

FIG. 4 depicts a circuit diagram of the multi-power supply system in FIG. 2 according to still another embodiment. As compared with FIG. 3A, the first protection circuit 119 in FIG. 4 further comprises a first surge protection circuit 410 besides the first fuse F1. The first fuse F1 is electrically coupled to the first reverse current prevention circuit 116 and the first input circuit 114. The first surge protection circuit 410 is electrically coupled to the first reverse current prevention circuit 116 and the first converter circuit 112. Similarly, the second protection circuit 129 further comprises a second surge protection circuit 420 besides the first fuse F2. The second fuse F2 is electrically coupled to the second reverse current prevention circuit 126 and the second input circuit 124. The second surge protection circuit 420 is electrically coupled to the second reverse current prevention circuit 126 and the second converter circuit 122. The first surge protection circuit 410 comprises a semiconductor device S9 and resistors R1, R3. The semiconductor device S9 is connected in series with the resistor R1. The resistor R3 is connected in parallel with the semiconductor device S9 and resistor R1 which are connected in series. The second surge protection circuit 420 comprises a semiconductor device S10 and resistors R2, R4. The semiconductor device S10 is connected in series with the resistor R2. The resistor R4 is connected in parallel with the semiconductor device S10 and resistor R2 which are connected in series.

In other embodiments, the first protection circuit 119 may also comprise an electromagnetic interference filtering circuit, an input sensing circuit, or a surge protection circuit disposed at the front end of the first reverse current prevention circuit 116, but the present disclosure is not limited in this regard. Similarly, the second protection circuit 129 may also comprise an electromagnetic interference filtering circuit, an input sensing circuit, or a surge protection circuit disposed at the front end of the second reverse current prevention circuit 126, but the present disclosure is not limited in this regard. In addition, in other embodiments, the first surge protection circuit 410 may be disposed at the front end or the back end of the first reverse current prevention circuit 116, and the second surge protection unit 420 may be disposed at the front end or the back end of the second reverse current prevention circuit 126. Those of ordinary skill in the art may adjust flexibly depending on the requirements then.

In FIG. 4, the first switch W1 comprises two semiconductor devices S3, S4 connected in series opposing and the second switch W2 further comprises two semiconductor devices S5, S6 connected in series opposing so as to improve stability. The first converter circuit 112 is a first boost converter circuit. The first boost converter circuit is electrically coupled to a first back-end circuit 117 (such as other converter circuit). The first back-end circuit 117 may be electrically coupled to a load (not shown in the figure). The second converter circuit 122 is a second boost converter circuit. The second boost converter circuit is electrically coupled to a second back-end circuit 127 (such as other converter circuit). The second back-end circuit 127 may be electrically coupled to the load (not shown in the figure). The first switch W1 has two terminals electrically coupled to a positive input terminal of the first boost converter circuit and a positive input terminal of the second boost converter circuit, respectively. The second switch W2 has two terminals electrically coupled to a negative input terminal of the first boost converter circuit and a negative input terminal of the second boost converter circuit, respectively. When both the first input circuit 114 and the second input circuit 124 are in normal operation, the control unit 140 (see FIG. 2) turns off the first switch W1 and the second switch W2. The first reverse current prevention circuit 116 and the second reverse current prevention circuit 126 are conducted. When the first input circuit 114 is in normal operation and the second input circuit 124 is in abnormal operation, the control unit 140 turns on the first switch W1 and the second switch W2 to cut off the second reverse current prevention circuit 126. Hence, both the first boost converter circuit and the second boost converter circuit receive the power supplied by the first input circuit 114. When the second input circuit 124 is in normal operation and the first input circuit 114 is in abnormal operation, the control unit 140 turns on the first switch W1 and the second switch W2 to cut off the first reverse current prevention circuit 116. Hence, both the first boost converter circuit and the second boost converter circuit receive the power supplied by the second input circuit 124.

In FIG. 4, although the positive terminal of the first input circuit 114 is electrically coupled to the positive terminal of the second input terminal 124, the present disclosure is not limited in this regard. In other embodiments, the negative terminal of the first input circuit 114 may be electrically coupled to the negative terminal of the second input circuit 124. Those of ordinary skill in the art may adjust flexibly depending on the requirements then. In one embodiment, if the positive terminal of the first input circuit 114 is electrically coupled to the positive terminal of the second input circuit 124, the first switch W1 can be omitted. Conversely, if the negative terminal of the first input circuit 114 is electrically coupled to the negative terminal of the second input circuit 124, the second switch W2 can be omitted.

Figure 7:
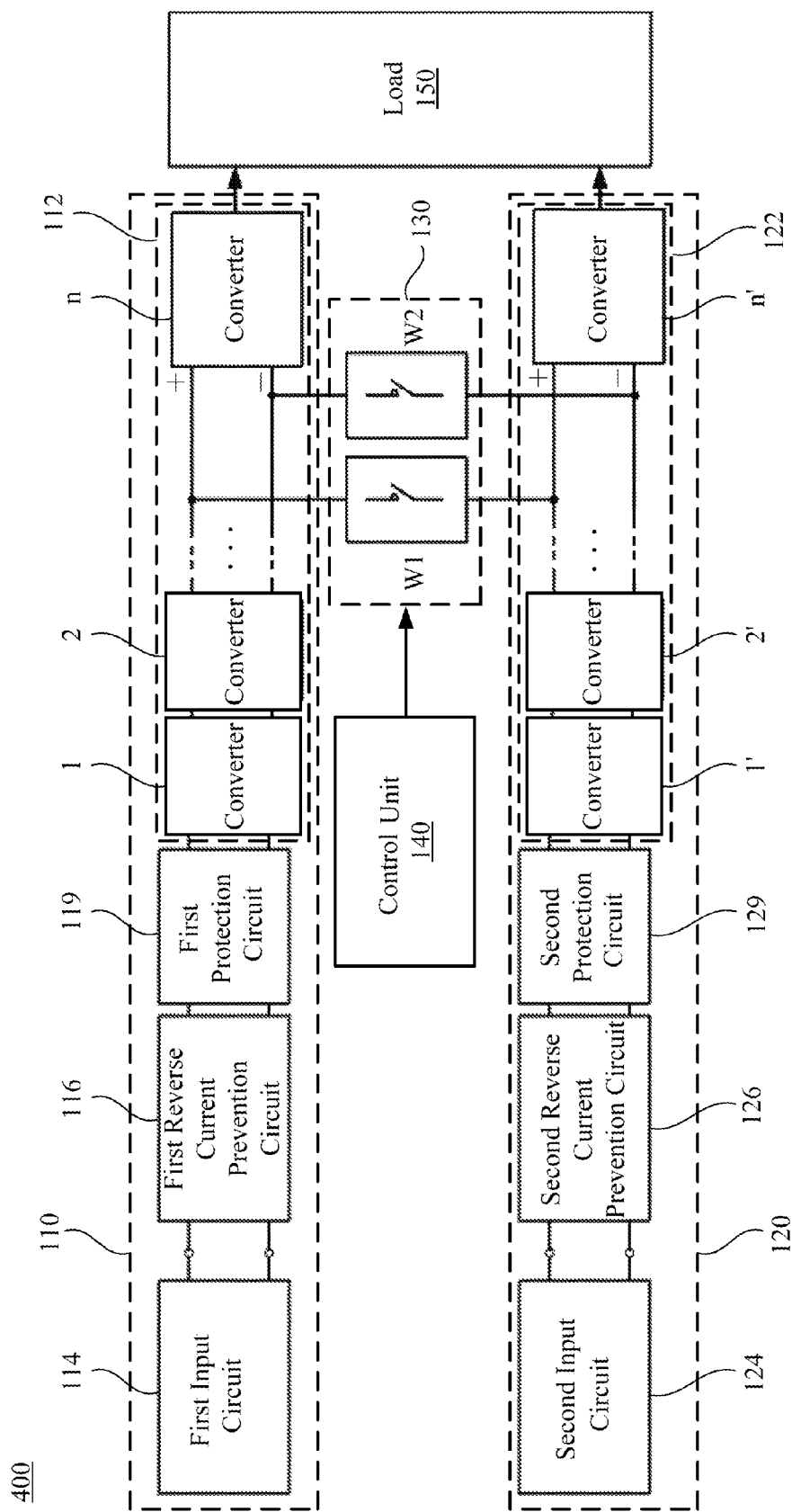
Figure 8:
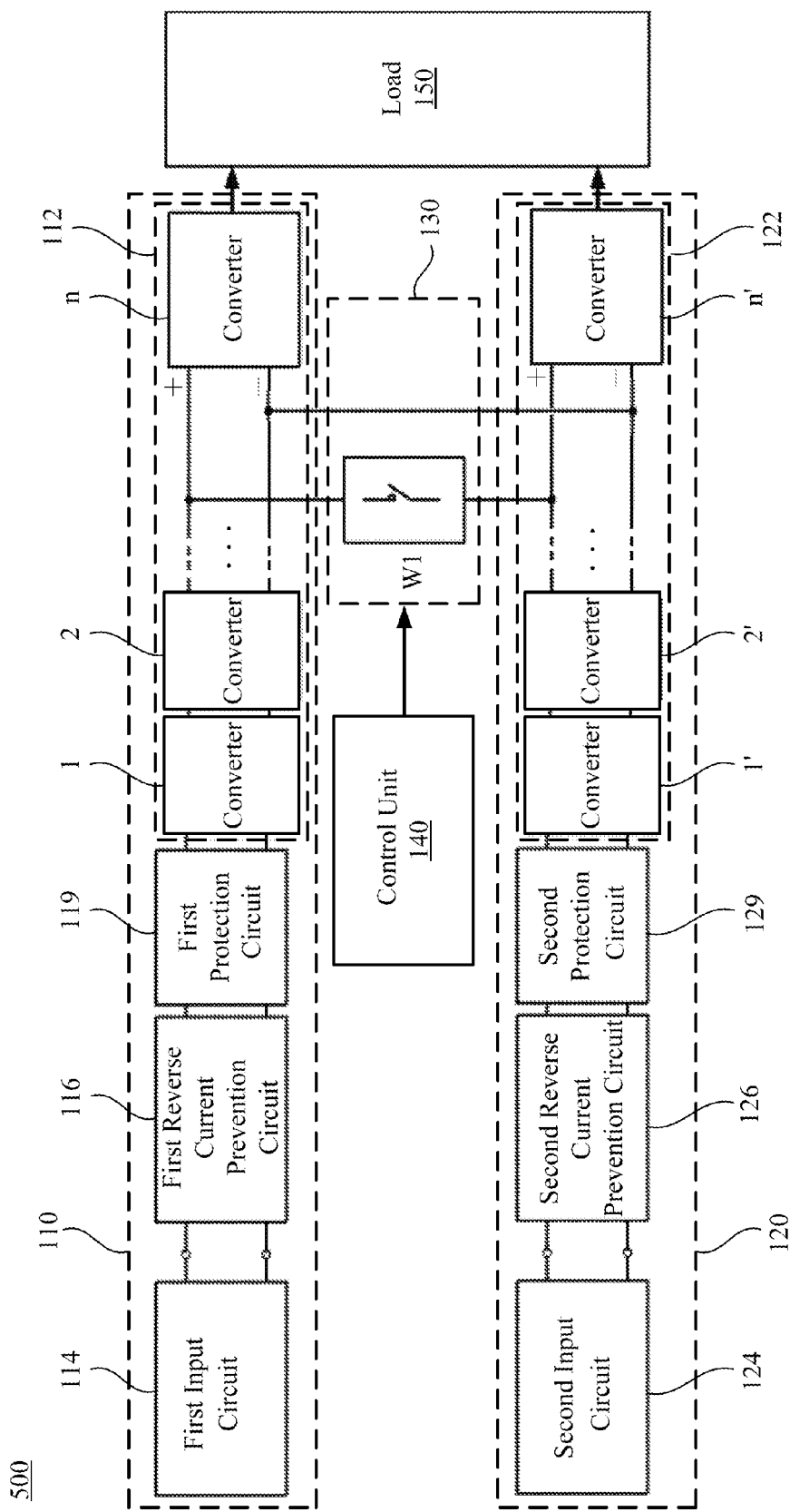
Figure 9:
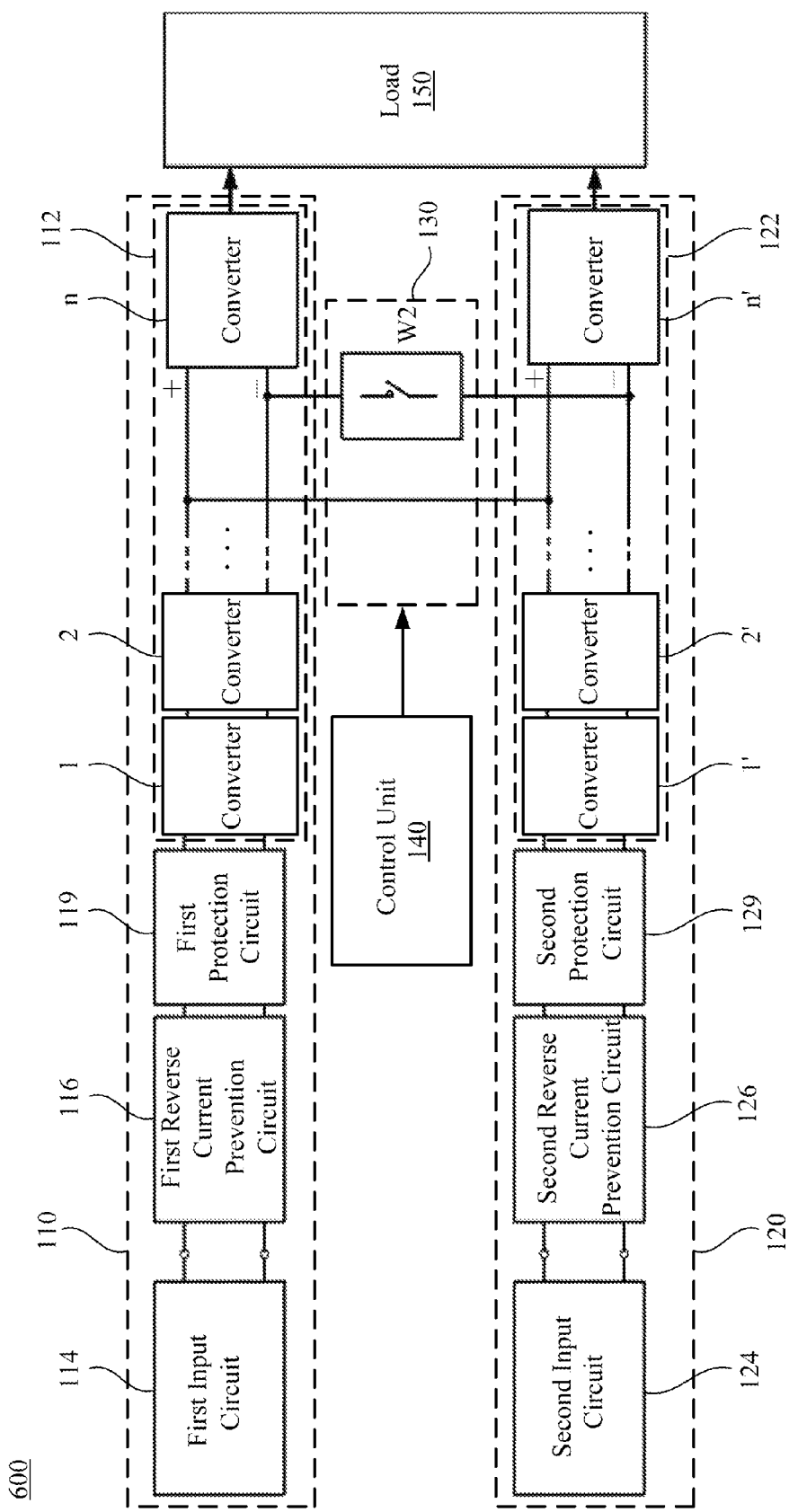

The switching unit of the multi-power supply system may not only be the structure having two switches as shown in FIG. 2 but also may comprise only the first switch W1 or the second switch W2. Similarly, the arrangement of the switching unit may vary. The switching unit may be disposed in the same arrangement as shown FIG. 1, or at the front end of the protection circuit, or at the front end of one of the converters in the first and second converter circuits as shown in FIG. 7 to FIG. 9. However, the present disclosure is not limited in this regard, and those of ordinary skill in the art may select the structure and arrangement of the switching unit depending on practical applications.

Figure 5:
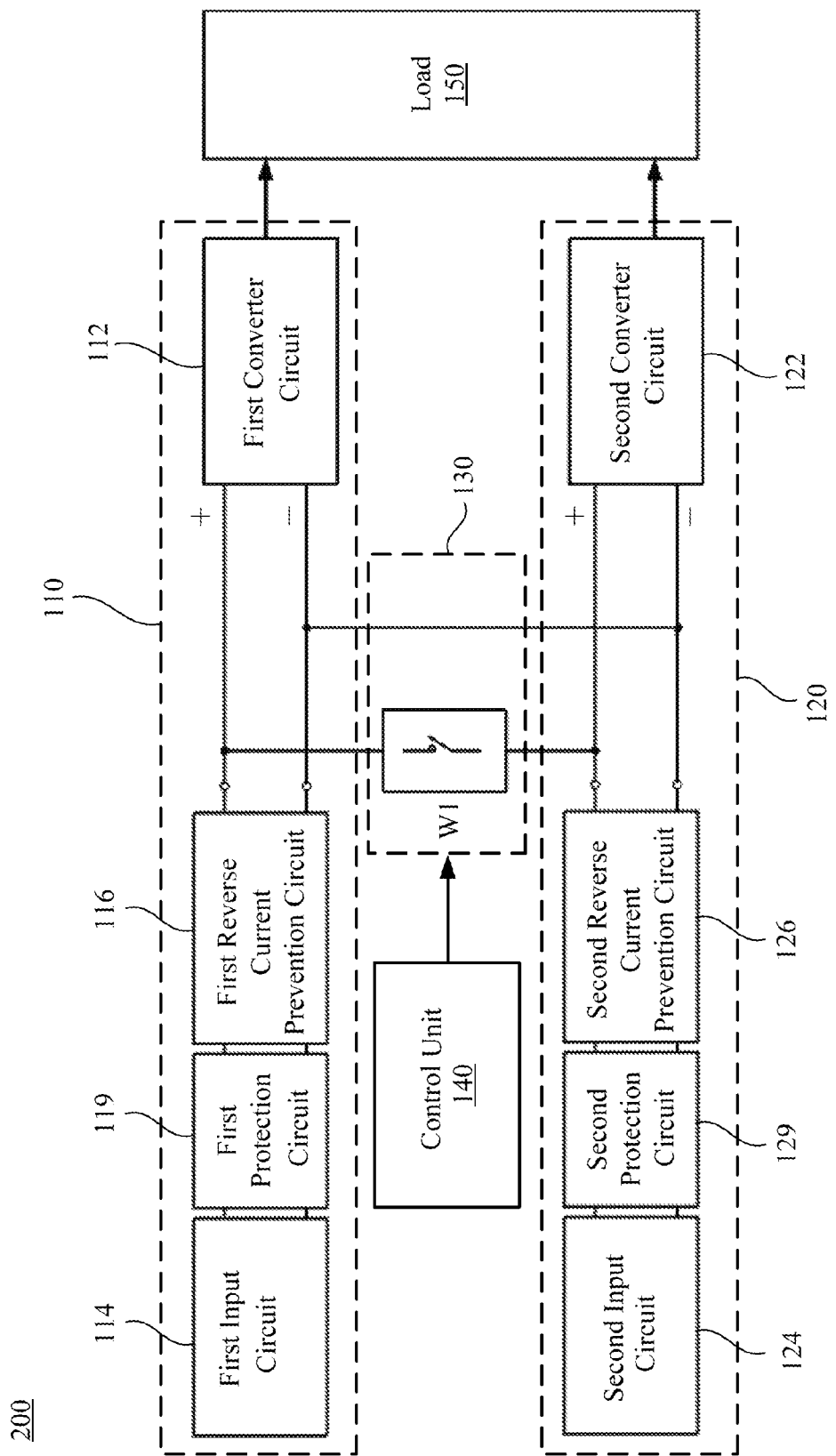
FIG. 5 to FIG. 12 respectively depict schematic diagram of the switching unit of the multi-power supply system according to embodiments.

FIG. 5 depicts a block diagram of a multi-power supply system 200 according to another embodiment. As compared with FIG. 2, the multi-power supply system 200 in FIG. 5 is substantially similar to the multi-power supply system 100 in FIG. 2 except for the second switch W2 in FIG. 2 being omitted. In FIG. 5, the switching unit 130 comprises the first switch W1. In the structure, the first switch W1 has two terminals electrically couple to the positive input terminal of the first converter circuit 112 and the positive input terminal of the second converter circuit 122, respectively. The negative input terminal of the first converter circuit 112 and the negative input terminal of the second converter circuit 122 are short-circuited or electrically disconnected. In utilization, when the first input circuit 114 is in normal operation and the second input circuit 124 is in abnormal operation, the control unit 140 turns on the first switch W1 to cut off the second reverse current prevention circuit 126. Hence, both the first converter circuit 112 and the second converter circuit 122 receive the power supplied by the first input circuit 114. When the second input circuit 124 is in normal operation and the first input circuit 114 is in abnormal operation, the control unit 140 turns on the first switch W1 to cut off the first reverse current prevention circuit 116. Hence, both the first converter circuit 112 and the second converter circuit 122 receive the power supplied by the second input circuit 124. In this manner, the full-load output is realized. In addition, when the control unit 140 turns off the first switch W1, the first and second reverse current prevention circuits 116, 126 operate normally. The first converter circuit 112 and the second converter circuit 122 receive the power supplied by the first input circuit 114 and the second input circuit 124 respectively.

Figure 6:
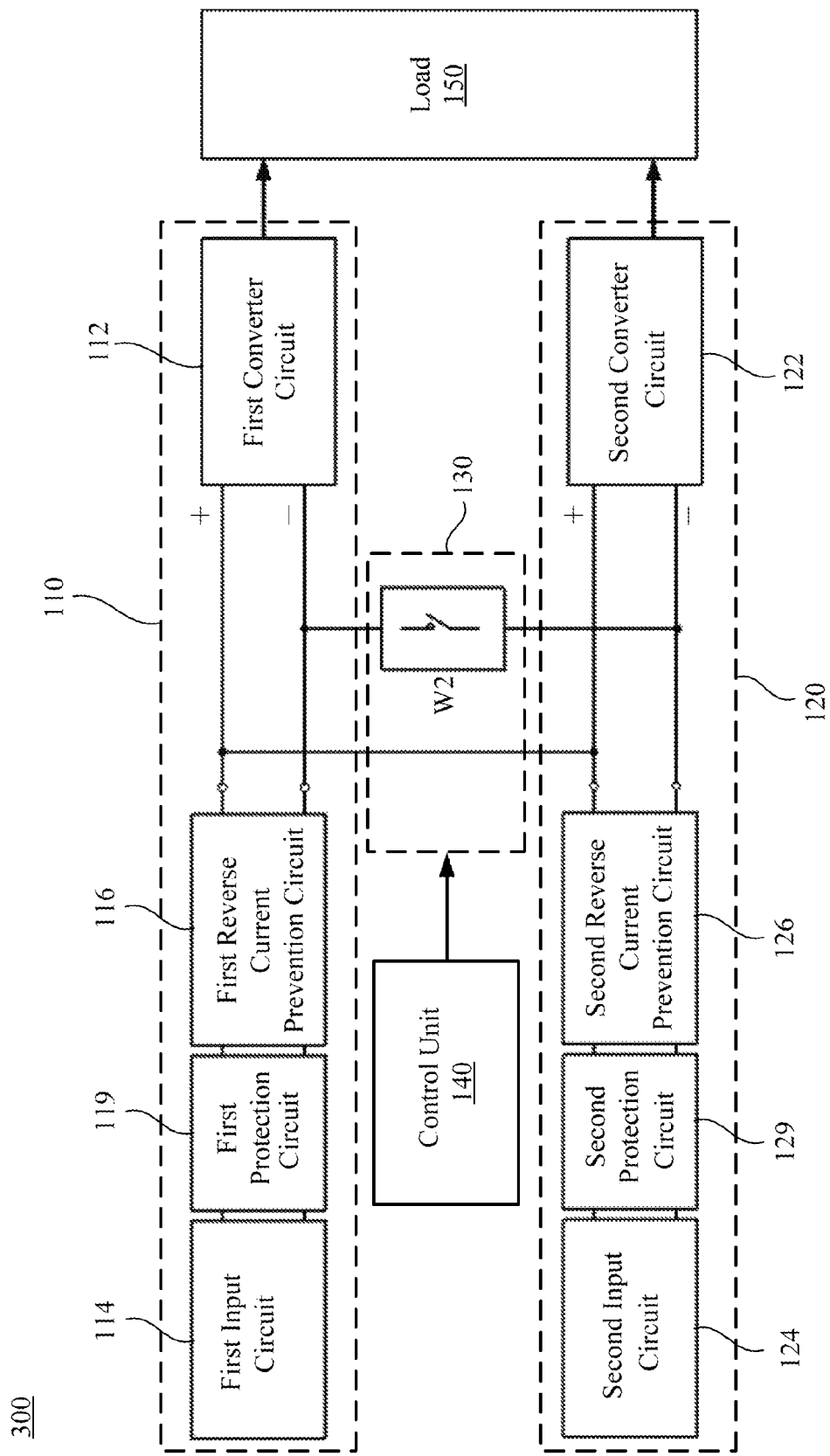

FIG. 6 depicts a block diagram of a multi-power supply system 300 according to still another embodiment. As compared with FIG. 2, the multi-power supply system 300 in FIG. 6 is substantially similar to the multi-power supply system 100 in FIG. 2 except for the first switch W1 in FIG. 2 being omitted. In FIG. 6, the switching unit 130 comprises the second switch W2. In the structure, the second switch W2 has two terminals electrically couple to the negative input terminal of the first converter circuit 112 and the negative input terminal of the second converter circuit 122, respectively. The positive input terminal of the first converter circuit 112 and the positive input terminal of the second converter circuit 122 are short-circuited or electrically disconnected. In utilization, when the first input circuit 114 is in normal operation and the second input circuit 124 is in abnormal operation, the control unit 140 turns on the second switch W2 to cut off the second reverse current prevention circuit 126. Hence, both the first converter circuit 112 and the second converter circuit 122 receive the power supplied by the first input circuit 114. When the second input circuit 124 is in normal operation and the first input circuit 114 is in abnormal operation, the control unit 140 turns on the second switch W2 to cut off the first reverse current prevention circuit 116. Hence, both the first converter circuit 112 and the second converter circuit 122 receive the power supplied by the second input circuit 124. In this manner, the full-load output is realized. In addition, when the control unit 140 turns off the second switch W2, the first and second reverse current prevention circuits 116, 126 operate normally. The first converter circuit 112 and the second converter circuit 122 receive the power supplied by the first input circuit 114 and the second input circuit 124 respectively.

In FIG. 1 to FIG. 6, the switching unit of the multi-power supply system is disposed in front of both the first converter circuit 112 and the second converter circuit 122. No matter which of the above situations occurs, there are always two converter circuits that collectively power the load 150 in real time. Hence, the converters in the first and second converter circuits 112, 122 can be designed based on the half load of the load 150 to save cost. The switching unit 130 is disposed on the back of the first and second protection circuits 119, 129 (such as an electromagnetic compatible filter).

FIG. 7 depicts a block diagram of a multi-power supply system 400 according to yet another embodiment. As compared with FIG. 2, the multi-power supply system 400 in FIG. 7 is substantially similar to the multi-power supply system 100 in FIG. 2 except for the switching unit 130 in FIG. 2 being moved from the front end to the back end of the first and second converter circuits 112, 122 and the arrangements of the first and second protection circuits 119, 129 being changed. In FIG. 7, the first converter circuit 112 comprises a plurality of converters, such as converter 1, converter 2, . . . , converter n. Each of the converter 1 to converter n may be a DC/DC converter, a DC/AC converter, an AC/DC converter, or an AC/AC converter. The second converter circuit 122 also comprises a plurality of converters, such as converter 1', converter 2', . . . , converter n'. Each of the converter 1' to converter n' may be a DC/DC converter, a DC/AC converter, an AC/DC converter, or an AC/AC converter. The switching unit 130 comprises the first switch W1 and the second switch W2. In the structure, the first switch W1 has two terminals electrically coupled to a positive input terminal of the converter n and a positive input terminal of the converter n', respectively. The second switch W2 has two terminals electrically coupled to a negative input terminal of the converter n and a negative input terminal of the converter n', respectively. In utilization, when the first input circuit 114 is in normal operation and the second input circuit 124 is in abnormal operation, the control unit 140 turns on the first switch W1 and the second switch W2 to cut off the second reverse current prevention circuit 126. Hence, both the converter n and the converter n' receive the power supplied by the first input circuit 114. When the second input circuit 124 is in normal operation and the first input circuit 114 is in abnormal operation, the control unit 140 turns on the first switch W1 and the second switch W2 to cut off the first reverse current prevention circuit 116. Hence, both the converter n and the converter n' receive the power supplied by the second input circuit 124. In this manner, the full-load output is realized. In addition, when the control unit 140 turns off the first switch W1 and the second switch W2, the first and second reverse current prevention circuits 116, 126 operate normally. The converter n and the converter n' receive the power supplied by the first input circuit 114 and the second input circuit 124 respectively.

FIG. 8 depicts a block diagram of a multi-power supply system 500 according to another embodiment. As compared with FIG. 7, the multi-power supply system 500 in FIG. 8 is substantially similar to the multi-power supply system 400 in FIG. 7 except for the second switch W2 in FIG. 7 being omitted. In FIG. 8, the first converter circuit 112 comprises a plurality of converters, such as converter 1, converter 2, . . . , converter n. Each of the converter 1 to converter n may be a DC/DC converter, a DC/AC converter, an AC/DC converter, or an AC/AC converter. The second converter circuit 122 also comprises a plurality of converters, such as converter 1', converter 2', . . . , converter n'. Each of the converter 1' to converter n' may be a DC/DC converter, a DC/AC converter, an AC/DC converter, or an AC/AC converter. The switching unit 130 comprises the first switch W1. In the structure, the first switch W1 has two terminals electrically coupled to the positive input terminal of the converter n and the positive input terminal of the converter n', respectively. The negative input terminal of converter n and the negative input terminal of the converter n' are short-circuited or electrically disconnected. In utilization, when the first input circuit 114 is in normal operation and the second input circuit 124 is in abnormal operation, the control unit 140 turns on the first switch W1 to cut off the second reverse current prevention circuit 126. Hence, both the converter n and the converter n' receive the power supplied by the first input circuit 114. When the second input circuit 124 is in normal operation and the first input circuit 114 is in abnormal operation, the control unit 140 turns on the first switch W1 to cut off the first reverse current prevention circuit 116. Hence, both the converter n and the converter n' receive the power supplied by the second input circuit 124. In this manner, the full-load output is realized. In addition, when the control unit 140 turns off the first switch W1, the first and second reverse current prevention circuits 116, 126 operate normally. The converter n and the converter n' receive the power supplied by the first input circuit 114 and the second input circuit 124 respectively.

FIG. 9 depicts a block diagram of a multi-power supply system 600 according to still another embodiment. As compared with FIG. 7, the multi-power supply system 600 in FIG. 9 is substantially similar to the multi-power supply system 400 in FIG. 7 except for the first switch W1 in FIG. 7 being omitted. In FIG. 9, the first converter circuit 112 comprises a plurality of converters, such as converter 1, converter 2, . . . , converter n. Each of the converter 1 to converter n may be a DC/DC converter, a DC/AC converter, an AC/DC converter, or an AC/AC converter. The second converter circuit 122 also comprises a plurality of converters, such as converter 1', converter 2', . . . , converter n'. Each of the converter 1' to converter n' may be a DC/DC converter, a DC/AC converter, an AC/DC converter, or an AC/AC converter. The switching unit 130 comprises the second switch W2. In the structure, the second switch W2 has two terminals electrically coupled to the negative input terminal of the converter n and the negative input terminal of the converter n', respectively. The positive input terminal of converter n and the positive input terminal of the converter n' are short-circuited or electrically disconnected. In utilization, when the first input circuit 114 is in normal operation and the second input circuit 124 is in abnormal operation, the control unit 140 turns on the second switch W2 to cut off the second reverse current prevention circuit 126. Hence, both the converter n and the converter n' receive the power supplied by the first input circuit 114. When the second input circuit 124 is in normal operation and the first input circuit 114 is in abnormal operation, the control unit 140 turns on the second switch W2 to cut off the first reverse current prevention circuit 116. Hence, both the converter n and the converter n' receive the power supplied by the second input circuit 124. In this manner, the full-load output is realized. In addition, when the control unit 140 turns off the second switch W2, the first and second reverse current prevention circuits 116, 126 operate normally. The converter n and the converter n' receive the power supplied by the first input circuit 114 and the second input circuit 124 respectively.

In FIG. 7 to FIG. 9, the switching unit 130 is disposed at the front end of the converter n and the converter n'. Therefore, the converter 1 to converter n-1 in the first converter circuit 112 and the converter 1' to the converter (n-1)' in the second converter circuit 122 need to be designed based on the full load. The subsequent converter n and converter n' can be designed based on the half load. The design cost for system is thus reduced. In practical applications, the arrangement of the switching unit is not limited to the arrangement shown in FIG. 7 to FIG. 9. The switching unit may be disposed at the front end of any of the converters in the converter circuits as required by practical needs. At the same time, the converters on the back of the switching unit can be designed based on the half load.

Figure 10:
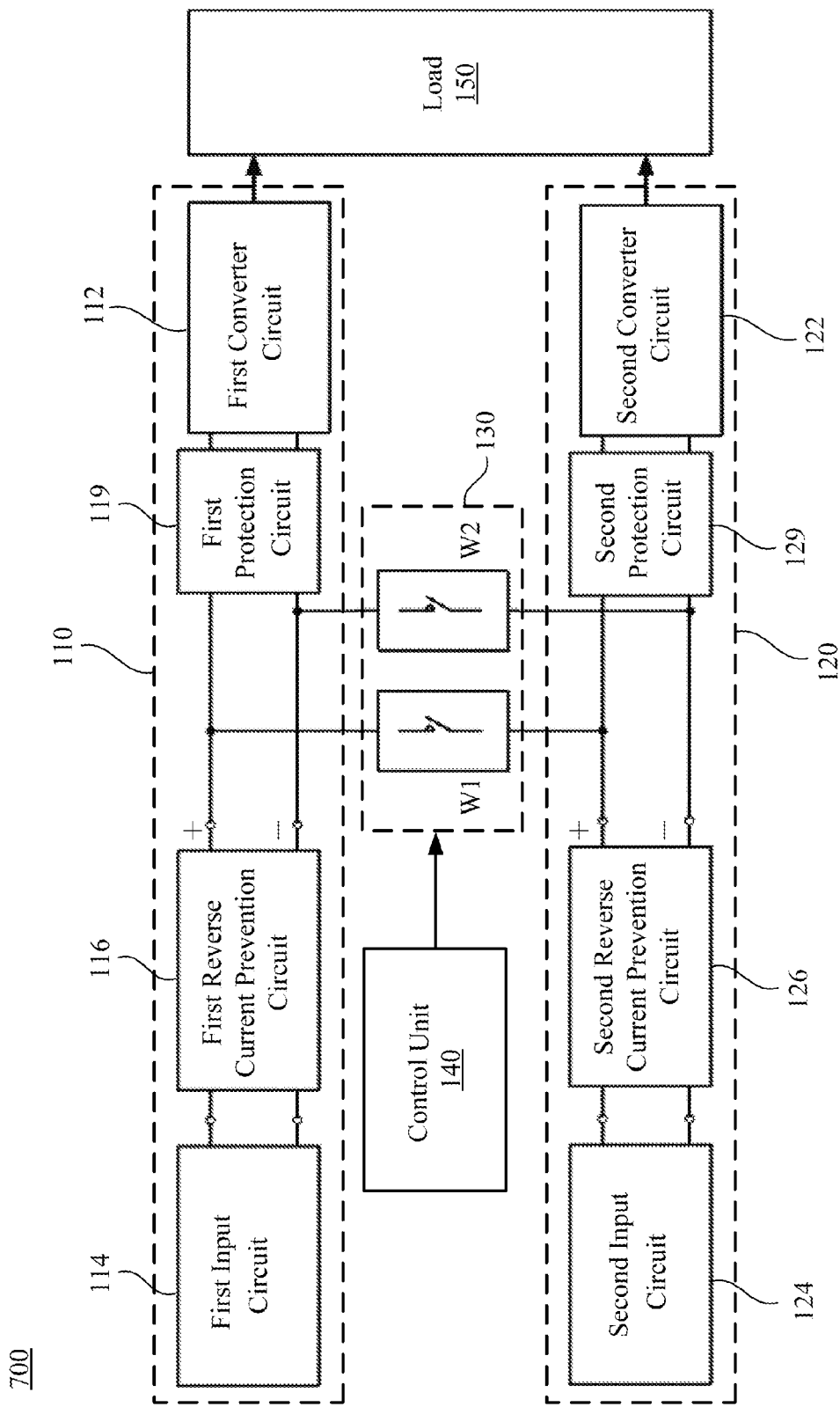

FIG. 10 depicts a block diagram of a multi-power supply system 700 according to yet another embodiment. As compared with FIG. 2, the multi-power supply system 700 in FIG. 10 is substantially similar to the multi-power supply system 100 in FIG. 2 except for the switching unit 130 in FIG. 2 being moved to the front end of the first protection circuit 119 and second protection circuit 129 and the arrangements of the first protection circuit 119 and second protection circuit 129 being changed. In FIG. 10, the switching unit 130 comprises the first switch W1 and the second switch W2. In the structure, the first switch W1 has two terminals electrically coupled to a positive output terminal of the first reverse current prevention circuit 116 and a positive output terminal of the second reverse current prevention circuit 126, respectively. The second switch W2 has two terminals electrically coupled to a negative output terminal of the first reverse current prevention circuit 116 and a negative output terminal of the second reverse current prevention circuit 126, respectively. In utilization, when the first input circuit 114 is in normal operation and the second input circuit 124 is in abnormal operation, the control unit 140 turns on the first switch W1 and the second switch W2 to cut off the second reverse current prevention circuit 126. Hence, both the first converter circuit 112 and the second converter circuit 122 receive the power supplied by the first input circuit 114. When the second input circuit 124 is in normal operation and the first input circuit 114 is in abnormal operation, the control unit 140 turns on the first switch W1 and the second switch W2 to cut off the first reverse current prevention circuit 116. Hence, both the first converter circuit 112 and the second converter circuit 122 receive the power supplied by the second input circuit 124. In this manner, the full-load output is realized. In addition, when the control unit 140 turns off the first switch W1 and the second switch W2, the first reverse current prevention circuit 116 and second reverse current prevention circuit 126 operate normally. The first converter circuit 112 and the second converter circuit 122 receive the power supplied by the first input circuit 114 and the second input circuit 124 respectively.

Figure 11:
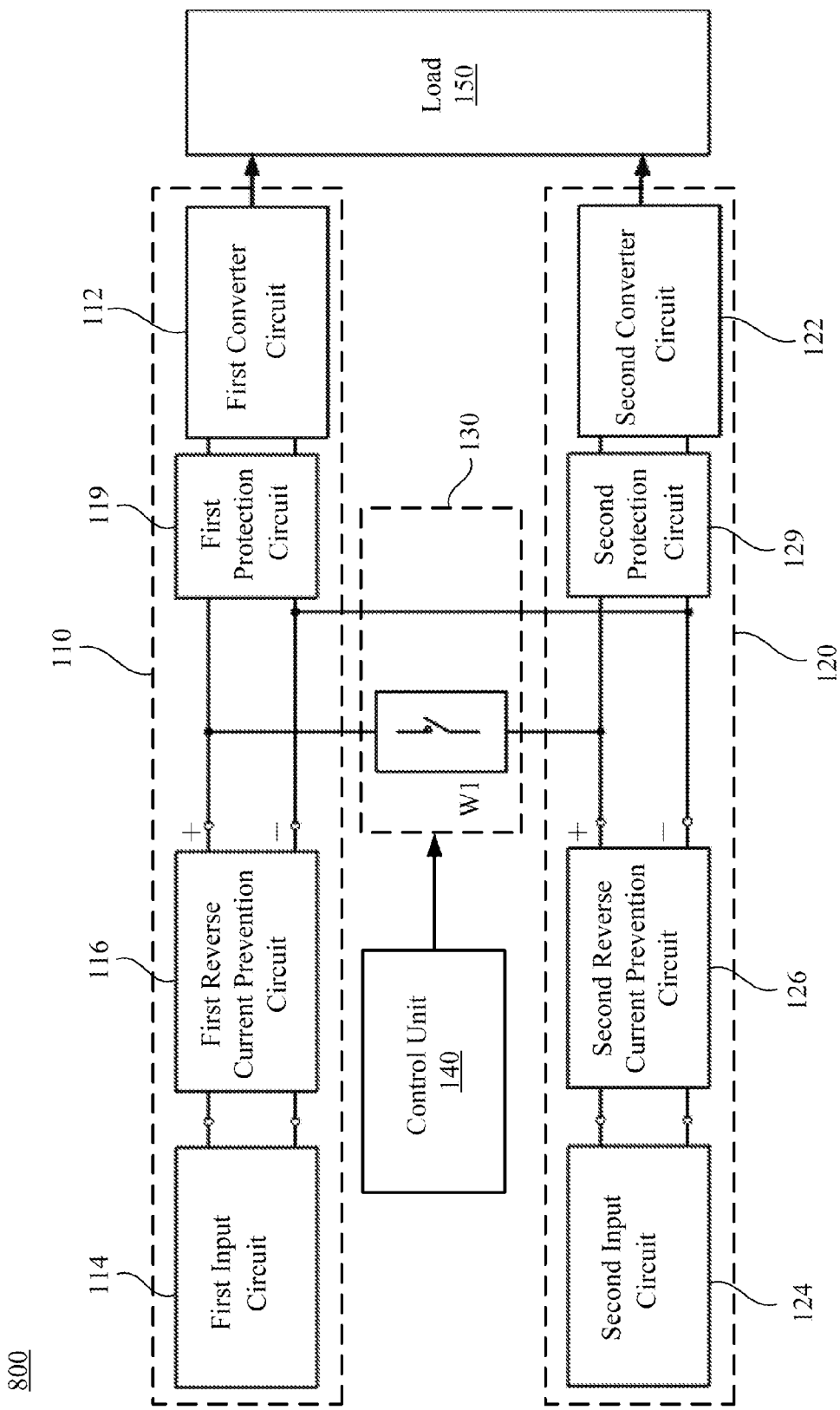

FIG. 11 depicts a block diagram of a multi-power supply system 800 according to another embodiment. As compared with FIG. 10, the multi-power supply system 800 in FIG. 11 is substantially similar to the multi-power supply system 700 in FIG. 10 except for the second switch W2 in FIG. 10 being omitted. In FIG. 11, the switching unit 130 comprises the first switch W1. In the structure, the first switch W1 has two terminals electrically coupled to the positive output terminal of the first reverse current prevention circuit 116 and the positive output terminal of the second reverse current prevention circuit 126, respectively. The negative output terminal of the first reverse current prevention circuit 116 and the negative output terminal of the second reverse current prevention circuit 126 are short-circuited or electrically disconnected. In utilization, when the first input circuit 114 is in normal operation and the second input circuit 124 is in abnormal operation, the control unit 140 turns on the first switch W1 to cut off the second reverse current prevention circuit 126. Hence, both the first converter circuit 112 and the second converter circuit 122 receive the power supplied by the first input circuit 114. When the second input circuit 124 is in normal operation and the first input circuit 114 is in abnormal operation, the control unit 140 turns on the first switch W1 to cut off the first reverse current prevention circuit 116. Hence, both the first converter circuit 112 and the second converter circuit 122 receive the power supplied by the second input circuit 124. In this manner, the full-load output is realized. In addition, when the control unit 140 turns off the first switch W1, the first and second reverse current prevention circuits 116, 126 operate normally. The first converter circuit 112 and the second converter circuit 122 receive the power supplied by the first input circuit 114 and the second input circuit 124 respectively.

Figure 12:
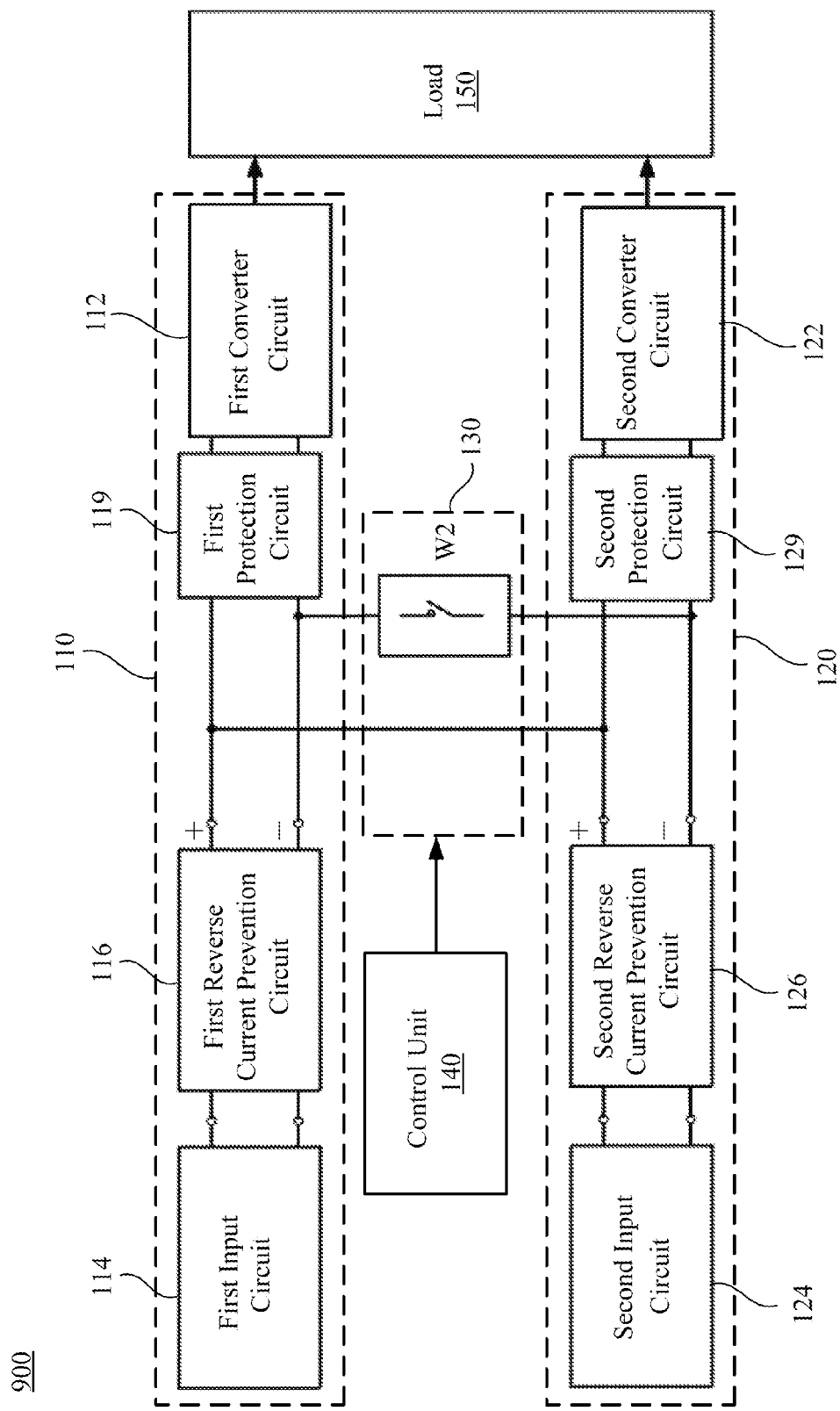

FIG. 12 depicts a block diagram of a multi-power supply system 900 according to still another embodiment. As compared with FIG. 10, the multi-power supply system 900 in FIG. 12 is substantially similar to the multi-power supply system 700 in FIG. 10 except for the first switch W1 in FIG. 10 being omitted. In FIG. 12, the switching unit 130 comprises the second switch W2. In the structure, the second switch W2 has two terminals electrically coupled to the negative output terminal of the first reverse current prevention circuit 116 and the negative output terminal of the second reverse current prevention circuit 126, respectively. The positive output terminal of the first reverse current prevention circuit 116 and the positive output terminal of the second reverse current prevention circuit 126 are short-circuited or electrically disconnected. In utilization, when the first input circuit 114 is in normal operation and the second input circuit 124 is in abnormal operation, the control unit 140 turns on the second switch W2 to cut off the second reverse current prevention circuit 126. Hence, both the first converter circuit 112 and the second converter circuit 122 receive the power supplied by the first input circuit 114. When the second input circuit 124 is in normal operation and the first input circuit 114 is in abnormal operation, the control unit 140 turns on the second switch W2 to cut off the first reverse current prevention circuit 116. Hence, both the first converter circuit 112 and the second converter circuit 122 receive the power supplied by the second input circuit 124. In this manner, the full-load output is realized. In addition, when the control unit 140 turns off the second switch W2, the first and second reverse current prevention circuits 116, 126 operate normally. The first converter circuit 112 and the second converter circuit 122 receive the power supplied by the first input circuit 114 and the second input circuit 124 respectively.

In FIG. 10 to FIG. 12, since the switching unit 130 is disposed in front of the first and second protection circuits 119, 129, converters in the first and second protection circuits 119, 129 and the first converter circuit 112 and second converter circuit 122 can be designed based on half load to save the cost for system.

Figure 13:
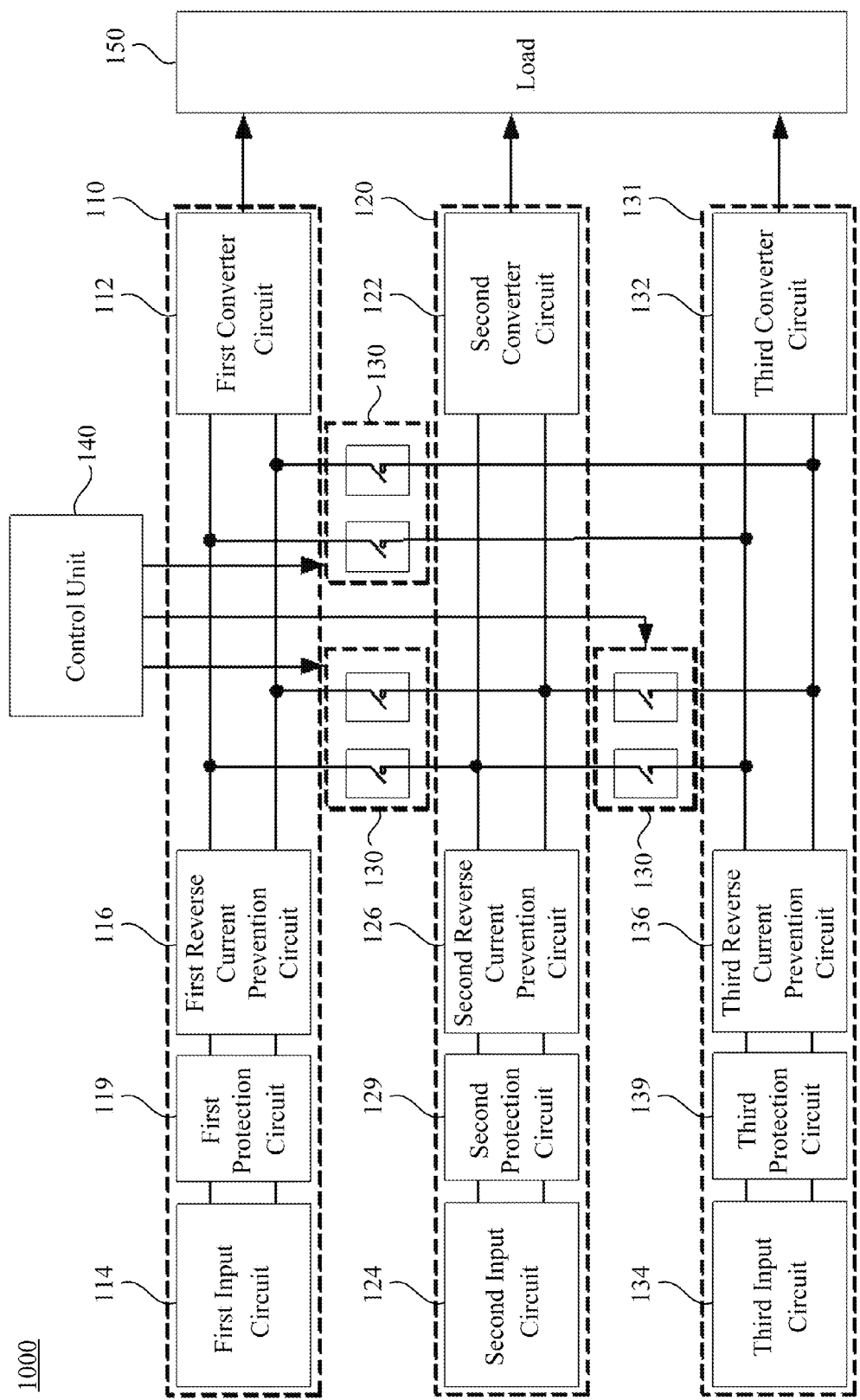
FIG. 13 depicts a schematic diagram of the multi-power supply system in FIG. 1 according to another embodiment.

In FIG. 1 to FIG. 12, dual-power supply systems serve as examples, but the present disclosure is not limited in this regard. This kind of power supply system architecture can be flexibly applied to multi-power supply systems. FIG. 13 depicts a block diagram of the multi-power supply system in FIG. 1 according to another embodiment. As compared with FIG. 2, the multi-power supply system 1000 in FIG. 13 is substantially similar to the multi-power supply system 100 in FIG. 2 except for a third power-supply unit 131 being added and a number of the switching units 130 being increased. In FIG. 13, the switching units 130 are electrically coupled to the third power-supply unit 131. The third power-supply unit 131 comprises a third reverse current prevention circuit 136, a third converter circuit 132, and a third input circuit 134. The third input circuit 134 is electrically coupled to the third converter circuit 132 via the third reverse current prevention circuit 136. When the first input circuit 114, the second input circuit 124, and the third input circuit 134 are all in normal operation, the control unit 140 controls the switching units 130 not to operate. The first power-supply unit 110, the second power-supply unit 120, and the third power-supply unit 131 thus collectively power the load 150. When one or two of the first input circuit 114, the second input circuit 124, and the third input circuit 134 are in abnormal operation, the control unit 140 controls the switching unit(s) 130 to operate. The switching unit(s) 130 cooperates with the first reverse current prevention circuit 116, the second reverse current prevention circuit 126, and the third reverse current prevention circuit 136 so that the first converter circuit 112, the second converter circuit 122, and the third converter circuit 132 receive power of at least one of the first input circuit 114, the second input circuit 124, and the third input circuit 134 to collectively power the load 150. In practice, those of ordinary skill in the art may add an extra power-supply unit flexibly depending on the requirements then.

Figure 14:
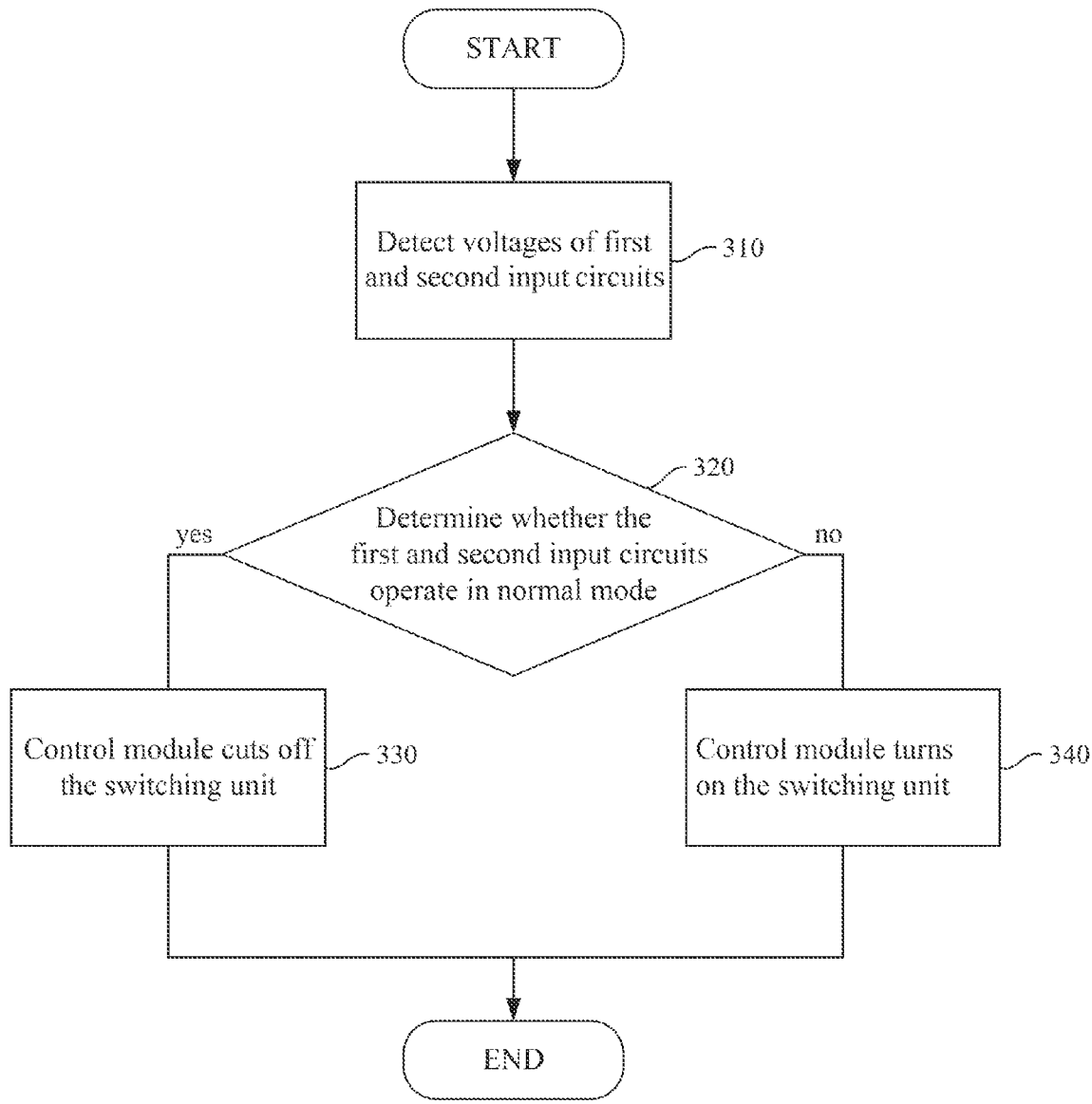
FIG. 14 depicts a flow chart of a control method of a multi-power supply system according to one embodiment.

Based on the multi-power supply system shown in FIG. 1 to FIG. 13, the present disclosure provides a control method correspondingly. FIG. 14 depicts a flow chart of a control method 1200 of a multi-power supply system according to one embodiment. As shown in FIG. 14, a control method 1200 comprises step 310 to step 340 (it should be understood that the order of the steps described in the present embodiment, unless specified otherwise, can be adjusted according to practical needs, or the steps or part of the steps can even be performed simultaneously). Since the hardware for implementing these steps has been described in detail in the previous embodiment, a description in this regard is not provided.

The multi-power supply system controlled by the control method 1200 comprises a first power-supply unit, a second power-supply unit, and a switching unit. The first power-supply unit comprises a first reverse current prevention circuit, a first converter circuit, and a first input circuit. The first input circuit is electrically coupled to the first converter circuit via the first reverse current prevention circuit. The second power-supply unit comprises a second reverse current prevention circuit, a second converter circuit, and a second input circuit. The second input circuit is electrically coupled to the second converter circuit via the second reverse current prevention circuit. The switching unit is electrically coupled to the first power-supply unit and the second power-supply unit. In the control method 1200, detect voltage of the first input circuit and voltage of the second input circuit, in step 310. In step 320, determine whether the first input circuit and the second input circuit are in normal operation, respectively. If both the first input circuit and second input circuit are in normal operation, in step 330, control the switching unit not to operate so as to allow the first power-supply unit and the second power-supply unit to collectively power a load. Conversely, if one of the first input circuit and the second input circuit is in abnormal operation, in step 340, control the switching unit to operate so as to allow the switching unit to cooperate with the first reverse current prevention circuit and the second reverse current prevention circuit. The first converter circuit and the second converter circuit receive power of at least one of the first input circuit and the second input circuits so as to provide power to the load simultaneously.

In one embodiment, when both the first input circuit and the second input circuit are in normal operation, in step 330, output a first level control signal. The first level control signal controls a switch of the switching unit to be turned off so that the switching unit does not operate.

In one embodiment, when one of the first input circuit and the second input circuit is in abnormal operation, in step 340, output a second level control signal. The second level control signal controls the switch of the switching unit to be tuned on so that the switching unit operates.

In one embodiment, determine whether the first input circuit and the second input circuit are in normal operation. In step 320, the control method 1200 further comprises determining whether the voltage of the first input circuit and the voltage of the second input circuit are within a predetermined range, respectively. If the voltage of the first input circuit falls into the predetermined range, the first input circuit is determined to be normal. Conversely, If the voltage of the first input circuit does not fall into the predetermined range, the first input circuit is determined to be abnormal. If the voltage of the second input unit falls into the predetermined range, the second input unit is determined to be normal. Conversely, if the voltage of the second input unit does not fall into the predetermined range, the second input unit is determined to be abnormal In one embodiment, the first reverse current prevention circuit comprises a first semiconductor device. The second reverse current prevention circuit comprises a second semiconductor device. Two terminals of the first semiconductor device are electrically coupled to the first converter circuit and the first input circuit, respectively. Two terminals of the second semiconductor device are electrically coupled to the second converter circuit and the second input circuit, respectively. The control method 1200 further comprises: when the first input circuit and the second input circuit are in normal operation, a control unit turning off the switching unit, the first semiconductor device and the second semiconductor device being turned on, the first input circuit and the second input circuit respectively powering the first converter circuit and the second converter circuit; when the first input circuit is in normal operation and the second input circuit is in abnormal operation, turning on the switching unit, the first semiconductor device being turned on and the second semiconductor device being turned off, the first input circuit simultaneously supplying power to the first converter circuit and the second converter circuit so as to allow two converters to simultaneously provide power to a load; when the first input circuit is in abnormal operation and the second input circuit is in normal operation, turning on the switching unit, the first semiconductor device being cut off and the second semiconductor device being turned on, the second input circuit simultaneously supplying power to the first converter circuit and the second converter circuit so as to allow two converters to simultaneously provide power to the load.

In another embodiment, the first reverse current prevention circuit comprises two first semiconductor devices. Two terminals of one of the two first semiconductor devices are electrically coupled to a positive input terminal of the first converter circuit and a positive terminal of the first input circuit, respectively. Two terminals of the other of the two first semiconductor devices are electrically coupled to a negative input terminal of the first converter circuit and a negative terminal of the first input circuit, respectively. The second reverse current prevention circuit comprises two second semiconductor devices. Two terminals of one of the two second semiconductor devices are electrically coupled to a positive input terminal of the second converter circuit and a positive terminal of the second input circuit, respectively. Two terminals of the other of the two second semiconductor devices are electrically coupled to a negative input terminal of the second converter circuit and a negative terminal of the second input circuit, respectively. The control method 1200 comprises: when the first input circuit and the second input circuit are in normal operation, a control unit turning off the switching unit, the two first semiconductor devices and the two second semiconductor devices being turned on, the first input circuit and the second input circuit respectively powering the first converter circuit and the second converter circuit; when the first input circuit is in normal operation and the second input circuit is in abnormal operation, the control unit turning on the switching unit, at least one of the two second semiconductor devices being cut off and the two first semiconductor devices being turned on, the first input circuit simultaneously supplying power to the first converter circuit and the second converter circuit so as to allow two converters to simultaneously provide power to the load; when the first input circuit is in abnormal operation and the second input circuit is in normal operation, the control unit turning on the switching unit, at least one of the two first semiconductor devices being cut off and the two second semiconductor devices being turned on, the second input circuit simultaneously supplying power to the first converter circuit and the second converter circuit so as to allow two converters to simultaneously provide power to the load.

In one embodiment, the multi-power supply system further comprises a third power-supply unit. The third power-supply unit comprises a third reverse current prevention circuit, a third converter circuit, and a third input circuit. The third input circuit is electrically coupled to the third converter circuit via the third reverse current prevention circuit. The switching unit is electrically coupled to the third power-supply unit. The control method 1200 further comprises: when the switching unit is controlled not to operate, the first power-supply unit, the second power-supply unit, and the third power-supply unit collectively supplying power to the load; when the switching unit is controlled to operate, the switching unit cooperating with the first reverse current prevention circuit, the second reverse current prevention circuit, and the third reverse current prevention circuit, the first converter circuit, the second converter circuit, and the third converter circuit receiving power of at least one of the first input circuit, the second input circuit, and the third input circuit to provide power to a load. Since the control method of the multi-power supply system is similar to the above-mentioned control method, a description in this regard is not provided.

In summary, the present disclosure provides a technical solution in which a controllable switching unit is added in the multi-power supply system. In one embodiment, not only can power balance or current balance be realized when the multiple power supply inputs are in normal operation, but the switching of power supply is also achieved when at least one power source malfunctions. In other embodiment, the converters in the first converter circuit and the second converter circuit on the back of the switching unit can be designed based on half load (half of the full load) plus a margin to save cost. Similarly, the protection circuit can also be designed based on half load if the switching unit is disposed in front of the protection circuit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A multi-power supply system comprising:
   a plurality of power-supply units, each power-supply unit comprising a reverse current prevention circuit, a converter circuit, and an input circuit, the input circuit being electrically coupled to the converter circuit via the reverse current prevention circuit, wherein the plurality of power-supply units comprises:
      a first power-supply unit comprising a first reverse current prevention circuit, a first converter circuit, and a first input circuit, the first input circuit being electrically coupled to the first converter circuit via the first reverse current prevention circuit; and
      a second power-supply unit comprising a second reverse current prevention circuit (126), a second converter circuit, and a second input circuit, the second input circuit being electrically coupled to the second converter circuit via the second reverse current prevention circuit, the first converter circuit and the second converter circuit being electrically coupled to a load;
   a switching unit electrically coupled to the plurality of power-supply units; and
   a control unit electrically coupled to the switching unit;
   wherein when the first input circuit and the second input circuit are in normal operation, the control unit turns off the at least one switch of the switching unit, the first reverse current prevention circuit and the second reverse current prevention circuit are conducted;
   when the first input circuit is in normal operation and the second input circuit is in abnormal operation, the control unit turns on the at least one switch of the switching unit to cut off the second reverse current prevention circuit;
   when the second input circuit is in normal operation and the first input circuit is in abnormal operation, the control unit turns on at least one switch of the switching unit to cut off the first reverse current prevention circuit.

2. The multi-power supply system of claim 1, wherein the switching unit has at least one switch, the control unit outputs a first level control signal when all the input circuits of the plurality of power-supply units are in normal operation, the first level control signal controls the switch of the switching unit to turn off, and the switching unit does not operate.

3. The multi-power supply system of claim 1, wherein the switching unit has at least one switch, the control unit outputs a second level control signal when at least one of the input circuits of the plurality of power-supply units is in abnormal operation, the second level control signal controls the switch of the switching unit to turn on, and the switching unit operates.

4. The multi-power supply system of claim 1, wherein the control unit detects voltages of the input circuit, the control unit determines that the input circuit is in abnormal operation when the voltage of the input circuit does not fall into a predetermined range; the control unit determines that the input circuit is in normal operation when the voltage of the input circuit falls into a predetermined range.

5. The multi-power supply system of claim 1, wherein the input circuit is a DC power supply.

6. The multi-power supply system of claim 1, wherein the converter circuit comprises at least one converter, the converter comprises a DC/DC converter, a DC/AC converter, an AC/DC converter, or an AC/AC converter.

7. The multi-power supply system of claim 1, wherein the power-supply unit further comprises a protection circuit, the protection circuit is electrically coupled to at least one of the converter circuit, the input circuit, and the reverse current prevention circuit.

8. The multi-power supply system of claim 1, wherein the first converter circuit comprises at least one first converter, the second converter circuit comprises at least one second converter, the switching unit comprises:
   a first switch having two terminals electrically coupled to a positive input terminal of the at least one first converter in the first converter circuit and a positive input terminal of the at least one second converter in the second converter circuit, respectively; and
   a second switch having two terminals electrically coupled to a negative input terminal of the at least one first converter in the first converter circuit and a negative input terminal of the at least one second converter in the second converter circuit, respectively;
   wherein when the first input circuit and the second input circuit are in normal operation, the control unit turns off the first switch and the second switch, the first reverse current prevention circuit and the second reverse current prevention circuit are conducted to allow the first power-supply unit and the second power-supply unit to collectively supply power to the load;
   when the first input circuit is in normal operation and the second input circuit is in abnormal operation, the control unit turns on the first switch and the second switch to cut off the second reverse current prevention circuit so as to allow both the first converter circuit and the second converter circuit to receive power supplied by the first input circuit;
   when the second input circuit is in normal operation and the first input circuit is in abnormal operation, the control unit turns on the first switch and the second switch to cut off the first reverse current prevention circuit so as to allow both the first converter circuit and the second converter circuit to receive power supplied by the second input circuit.

9. The multi-power supply system of claim 1, wherein the first converter circuit comprises at least one first converter, the second converter circuit comprises at least one second converter, the switching unit comprises:
- a first switch having two terminals electrically coupled to a positive input terminal of the at least one first converter in the first converter circuit and a positive input terminal of the at least one second converter in the second converter circuit, respectively, a negative input terminal of the at least one first converter in the first converter circuit being short circuited to a negative input terminal of the at least one second converter in the second converter circuit;
- wherein when the first input circuit and the second input circuit are in normal operation, the control unit turns off the first switch, the first reverse current prevention circuit and the second reverse current prevention circuit are conducted to allow the first power-supply unit and the second power-supply unit to collectively supply power to the load;
- when the first input circuit is in normal operation and the second input circuit is in abnormal operation, the control unit turns on the first switch to cut off the second reverse current prevention circuit so as to allow both the first converter circuit and the second converter circuit to receive power supplied by the first input circuit;
- when the second input circuit is in normal operation and the first input circuit is in abnormal operation, the control unit turns on the first switch to cut off the first reverse current prevention circuit so as to allow both the first converter circuit and the second converter circuit to receive power supplied by the second input circuit.

10. The multi-power supply system of claim 1, wherein the first converter circuit comprises at least one first converter, the second converter circuit comprises at least one second converter, the switching unit comprises:
- a second switch having two terminals electrically coupled to a negative input terminal of the at least one first converter in the first converter circuit and a negative input terminal of the at least one second converter in the second converter circuit, respectively, a positive input terminal of the at least one first converter in the first converter circuit being short circuited to a positive input terminal of the at least one second converter in the second converter circuit;
- wherein when the first input circuit and the second input circuit are in normal operation, the control unit turns off the second switch, the first reverse current prevention circuit and the second reverse current prevention circuit are conducted to allow the first power-supply unit and the second power-supply unit to collectively supply power to the load;
- when the first input circuit is in normal operation and the second input circuit is in abnormal operation, the control unit turns on the second switch to cut off the second reverse current prevention circuit so as to allow both the first converter circuit and the second converter circuit to receive power supplied by the first input circuit;
- when the second input circuit is in normal operation and the first input circuit is in abnormal operation, the control unit turns on the second switch to cut off the first reverse current prevention circuit to so as allow both the first converter circuit and the second converter circuit to receive power supplied by the second input circuit.

11. The multi-power supply system of claim 1, wherein the switching unit comprises:
- a first switch having two terminals electrically coupled to a positive output terminal of the first reverse current prevention circuit and a positive output terminal of the second reverse current prevention circuit, respectively; and
- a second switch having two terminals electrically coupled to a negative output terminal of the first reverse current prevention circuit and a negative output terminal of the second reverse current prevention circuit, respectively;
- wherein when the first input circuit and the second input circuit are in normal operation, the control unit turns off the first switch and the second switch, the first reverse current prevention circuit and the second reverse current prevention circuit are conducted to allow the first power-supply unit and the second power-supply unit to collectively supply power to the load;
- when the first input circuit is in normal operation and the second input circuit is in abnormal operation, the control unit turns on the first switch and the second switch to cut off the second reverse current prevention circuit so as to allow both the first converter circuit and the second converter circuit to receive power supplied by the first input circuit;
- when the second input circuit is in normal operation and the first input circuit is in abnormal operation, the control unit turns on the first switch and the second switch to cut off the first reverse current prevention circuit so as to allow both the first converter circuit and the second converter circuit to receive power supplied by the second input circuit.

12. The multi-power supply system of claim 1, wherein the switching unit comprises:
- a first switch having two terminals electrically coupled to a positive output terminal of the first reverse current prevention circuit and a positive output terminal of the second reverse current prevention circuit, respectively, a negative output terminal of the first reverse current prevention circuit being short circuited to a negative output terminal of the second reverse current prevention circuit;
- wherein when the first input circuit and the second input circuit are in normal operation, the control unit turns off the first switch, the first reverse current prevention circuit and the second reverse current prevention circuit are conducted to allow the first power-supply unit and the second power-supply unit to collectively supply power to the load;
- when the first input circuit is in normal operation and the second input circuit is in abnormal operation, the control unit turns on the first switch to cut off the second reverse current prevention circuit so as to allow both the first converter circuit and the second converter circuit to receive power supplied by the first input circuit;
- when the second input circuit is in normal operation and the first input circuit is in abnormal operation, the control unit turns on the first switch to cut off the first reverse current prevention circuit so as to allow both the first converter circuit and the second converter circuit to receive power supplied by the second input circuit.

13. The multi-power supply system of claim 1, wherein the switching unit comprises:
a second switch having two terminals electrically coupled to a negative output terminal of the first reverse current prevention circuit and a negative output terminal of the second reverse current prevention circuit, respectively, a positive output terminal of the first reverse current prevention circuit being short circuited to a positive output terminal of the second reverse current prevention circuit;
wherein when the first input circuit and the second input circuit are in normal operation, the control unit turns off the second switch, the first reverse current prevention circuit and the second reverse current prevention circuit are conducted to allow the first power-supply unit and the second power-supply unit to collectively supply power to the load;
when the first input circuit is in normal operation and the second input circuit is in abnormal operation, the control unit turns on the second switch to cut off the second reverse current prevention circuit so as to allow both the first converter circuit and the second converter circuit to receive power supplied by the first input circuit;
when the second input circuit is in normal operation and the first input circuit is in abnormal operation, the control unit turns on the second switch to cut off the first reverse current prevention circuit so as to allow both the first converter circuit and the second converter circuit to receive power supplied by the second input circuit.

14. The multi-power supply system of claim 1, wherein the first reverse current prevention circuit comprises a first semiconductor device, the second reverse current prevention circuit comprises a second semiconductor device, two terminals of the first semiconductor device are electrically coupled to the first converter circuit and the first input circuit, respectively, and two terminals of the second semiconductor device are electrically coupled to the second converter circuit and the second input circuit, respectively;
wherein when the first input circuit and the second input circuit are in normal operation, the control unit turns off the switching unit, the first semiconductor device and the second semiconductor device are turned on, and the first input circuit and the second input circuit respectively supply power to the first converter circuit and the second converter circuit;
when the first input circuit is in normal operation and the second input circuit is in abnormal operation, the control unit turns on the switching unit, the first semiconductor device is turned on and the second semiconductor device is cut off, and the first input circuit supplies power to the first converter circuit and the second converter circuit simultaneously;
when the first input circuit is in abnormal operation and the second input circuit is in normal operation, the control unit turns on the switching unit, the first semiconductor device is cut off and the second semiconductor device is turned on, and the second input circuit supplies power to the first converter circuit and the second converter circuit simultaneously.

15. The multi-power supply system of claim 1, wherein the first reverse current prevention circuit comprises two first semiconductor devices, two terminals of one of the two first semiconductor devices are electrically coupled to a positive output terminal of the first converter circuit and a positive terminal of the first input circuit, respectively, two terminals of the other one of the two first semiconductor devices are electrically coupled to a negative input terminal of the first converter circuit and a negative terminal of the first input circuit, respectively, the second reverse current prevention circuit comprises two second semiconductor devices, two terminals of one of the two second semiconductor devices are electrically coupled to a positive input terminal of the second converter circuit and a positive terminal of the second input circuit, respectively, two terminals of the other one of the two second semiconductor device are electrically coupled to a negative input terminal of the second converter circuit and a negative terminal of the second input circuit, respectively;
wherein when the first input circuit and the second input circuit are in normal operation, the control unit turns off the switching unit, the two first semiconductor devices and the two second semiconductor devices are turned on, and the first input circuit and the second input circuit respectively supply power to the first converter circuit and the second converter circuit;
when the first input circuit is in normal operation and the second input circuit is in abnormal operation, the control unit turns on the switching unit, and the first input circuit supplies power to the first converter circuit and the second converter circuit simultaneously when at least one of the two second semiconductor devices is cut off and the two first semiconductor devices are turned on;
when the first input circuit is in abnormal operation and the second input circuit is in normal operation, the control unit turns on the switching unit, and the second input circuit supplies power to the first converter circuit and the second converter circuit simultaneously when at least one of the two first semiconductor devices is cut off and the two second semiconductor devices are turned on.

16. The multi-power supply system of claim 1, wherein the first converter circuit is a first boost converter circuit, the second converter circuit is a second boost converter circuit, the switching unit comprises:
a first switch having two terminals electrically coupled to a positive input terminal of the first boost converter circuit and a positive input terminal of the second boost converter circuit, respectively; and
a second switch having two terminals electrically coupled to a negative input terminal of the first boost converter circuit and a negative input terminal of the second boost converter circuit, respectively;
wherein when the first input circuit and the second input circuit are in normal operation, the control unit turns off the first switch and the second switch, the first reverse current prevention circuit and the second reverse current prevention circuit are conducted;
when the first input circuit is in normal operation and the second input circuit is in abnormal operation, the control unit turns on the first switch and the second switch to cut off the second reverse current prevention circuit so as to allow both the first boost converter circuit and the second boost converter circuit to receive power supplied by the first input circuit;
when the second input circuit is in normal operation and the first input circuit is in abnormal operation, the control unit turns on the first switch and the second switch to cut off the first reverse current prevention circuit so as to allow both the first boost converter circuit and the second boost converter circuit to receive power supplied by the second input circuit.

17. The multi-power supply system of claim 16, wherein the first switch comprises two semiconductor devices connected in series opposing, and the second switch comprises another two semiconductor devices connected in series opposing.

18. The multi-power supply system of claim 17, wherein the first power-supply unit further comprises a first protection circuit, the first protection circuit is electrically coupled to the first converter circuit, the second power-supply unit further comprises a second protection circuit, the second protection circuit is electrically coupled to the second converter circuit.

19. The multi-power supply system of claim 18, wherein the first protection circuit comprises a first fuse and a first surge protection circuit, the first fuse is electrically coupled to the first reverse current prevention circuit and the first input circuit, the first surge protection circuit is electrically coupled to the first reverse current prevention circuit and the first converter circuit, the second protection circuit comprises a second fuse and a second surge protection circuit, the second fuse is electrically coupled to the second reverse current prevention circuit and the second input circuit, the second surge protection circuit is electrically coupled to the second reverse current prevention circuit and the second converter circuit.

20. The multi-power supply system of claim 1, further comprising:
 a third power-supply unit comprising a third reverse current prevention circuit, a third converter circuit, and a third input circuit, the third input circuit being electrically coupled to the third converter circuit via the third reverse current prevention circuit;
 wherein the switching unit is electrically coupled to the third power-supply unit;
 when the control unit controls the switching unit not to operate, the first power-supply unit, the second power-supply unit, and the third power-supply unit collectively supply power to the load;
 when the control unit controls the switching unit to operate, the switching unit cooperates with the first reverse current prevention circuit, the second reverse current prevention circuit, and the third reverse current prevention circuit, the first converter circuit, the second converter circuit, and the third converter circuit receive power of at least one of the first input circuit, the second input circuit, and the third input circuit to operate normally.

21. A control method of a multi-power supply system as defined in claim 1, the control method comprising:
 (A). determining whether the input circuits of the plurality of power-supply units operate in normal operation;
 (B). when the first input circuit and the second input circuit are in normal operation, turning off the at least one switch of the switching unit, to conduct the first reverse current prevention circuit and the second reverse current prevention circuit, so as to allow the first power-supply unit and the second power-supply unit to collectively supply power to the load; and
 (C). when the first input circuit is in normal operation and the second input circuit is in abnormal operation, the control unit turns on the at least one switch of the switching unit to cut off the second reverse current prevention circuit; when the second input circuit is in normal operation and the first input circuit is in abnormal operation, the control unit turns on at least one switch of the switching unit to cut off the first reverse current prevention circuit.

22. The control method of the multi-power supply system of claim 21, further comprising:
 outputting a first level control signal when all the input circuits of the plurality of power-supply units are in normal operation, the first level control signal controlling a switch of the switching unit to turn off, and the switching unit not operating.

23. The control method of the multi-power supply system of claim 21, further comprising:
 outputting a second level control signal when at least one of the input circuit of the plurality of power-supply units is in abnormal operation, the second level control signal controlling a switch of the switching unit to turn on, and the switching unit operating.

24. The control method of the multi-power supply system of claim 21, further comprising:
 detecting voltages of the input circuit, determining the input circuit to be in abnormal operation when the voltage of the input circuit does not fall into a predetermined range, determining the input circuit to be in normal operation when the voltage of the input circuit falls into the predetermined range.

25. The control method of the multi-power supply system of claim 21, wherein the first reverse current prevention circuit comprises a first semiconductor device, the second reverse current prevention circuit comprises a second semiconductor device, two terminals of the first semiconductor device are electrically coupled to the first converter circuit and the first input circuit, respectively, and two terminals of the second semiconductor device are electrically coupled to the second converter circuit and the second input circuit, respectively, the control method further comprises:
 turning off the switching unit by the control unit when the first input circuit and the second input circuit are in normal operation, the first semiconductor device and the second semiconductor device being turned on, the first input circuit and the second input circuit respectively supplying power to the first converter circuit and the second converter circuit;
 turning on the switching unit when the first input circuit is in normal operation and the second input circuit is in abnormal operation, the first semiconductor device being turned on and the second semiconductor device being cut off, and the first input circuit supplying power to the first converter circuit and the second converter circuit simultaneously; and
 turning on the switching unit when the first input circuit is in abnormal operation and the second input circuit is in normal operation, the first semiconductor device being cut off and the second semiconductor device being turned on, and the second input circuit supplying power to the first converter circuit and the second converter circuit simultaneously.

26. The control method of the multi-power supply system of claim 21, wherein the first reverse current prevention circuit comprises two first semiconductor devices, two terminals of one of the two first semiconductor devices are electrically coupled to a positive output terminal of the first converter circuit and a positive terminal of the first input circuit, respectively, two terminals of the other one of the two first semiconductor devices are electrically coupled to a negative input terminal of the first converter circuit and a negative terminal of the first input circuit, respectively, the second reverse current prevention circuit comprises two second semiconductor devices, two terminals of one of the two second semiconductor devices are electrically coupled to a positive input terminal of the second converter circuit and a positive terminal of the second input circuit, respectively, two terminals of the other one of the two second semiconductor device are electrically coupled to a negative input terminal of the second converter circuit and a negative terminal of the second input circuit, respectively, the control method further comprises:

turning off the switching unit by the control unit when the first input circuit and the second input circuit are in normal operation, the two first semiconductor devices and the two second semiconductor devices being turned on, and the first input circuit and the second input circuit respectively supplying power to the first converter circuit and the second converter circuit;

turning on the switching unit by the control unit when the first input circuit is in normal operation and the second input circuit is in abnormal operation, at least one of the two second semiconductor devices being cut off and the two first semiconductor devices being turned on, and the first input circuit supplying power to the first converter circuit and the second converter circuit simultaneously; and turning on the switching unit by the control unit when the first input circuit is in abnormal operation and the second input circuit is in normal operation, at least one of the two first semiconductor devices being cut off and the two second semiconductor devices being turned on, and the second input circuit supplying power to the first converter circuit and the second converter circuit simultaneously.

27. The control method of the multi-power supply system of claim 21, wherein the multi-power supply system further comprises a third power-supply unit, the third power-supply unit comprises a third reverse current prevention circuit, a third converter circuit, and a third input circuit, the third input circuit is electrically coupled to the third converter circuit via the third reverse current prevention circuit, the switching unit is electrically coupled to the third power-supply unit, the control method further comprises:

supplying power to the load collectively by the first power-supply unit, the second power-supply unit, and the third power-supply unit when the switching unit is controlled not to operate; and cooperating with the first reverse current prevention circuit, the second reverse current prevention circuit, and the third reverse current prevention circuit by the switching unit when the switching unit is controlled to operate, the first converter circuit, the second converter circuit, and the third converter circuit receiving power of at least one of the first input circuit, the second input circuit, and the third input circuit to operate normally.

\* \* \* \* \*